Dec. 26, 1967  A. C. PALATINUS  3,360,729
INTERMODULATION DISTORTION TEST SET FOR INDEPENDENT
SIDEBAND TRANSMITTERS
Filed Aug. 27, 1965 8 Sheets-Sheet 1

INVENTOR.
ANTHONY C. PALATINUS
BY Ernest J Weinberger
John M. Pearce
ATTORNEYS

INVENTOR.
ANTHONY C. PALATINUS

ATTORNEYS

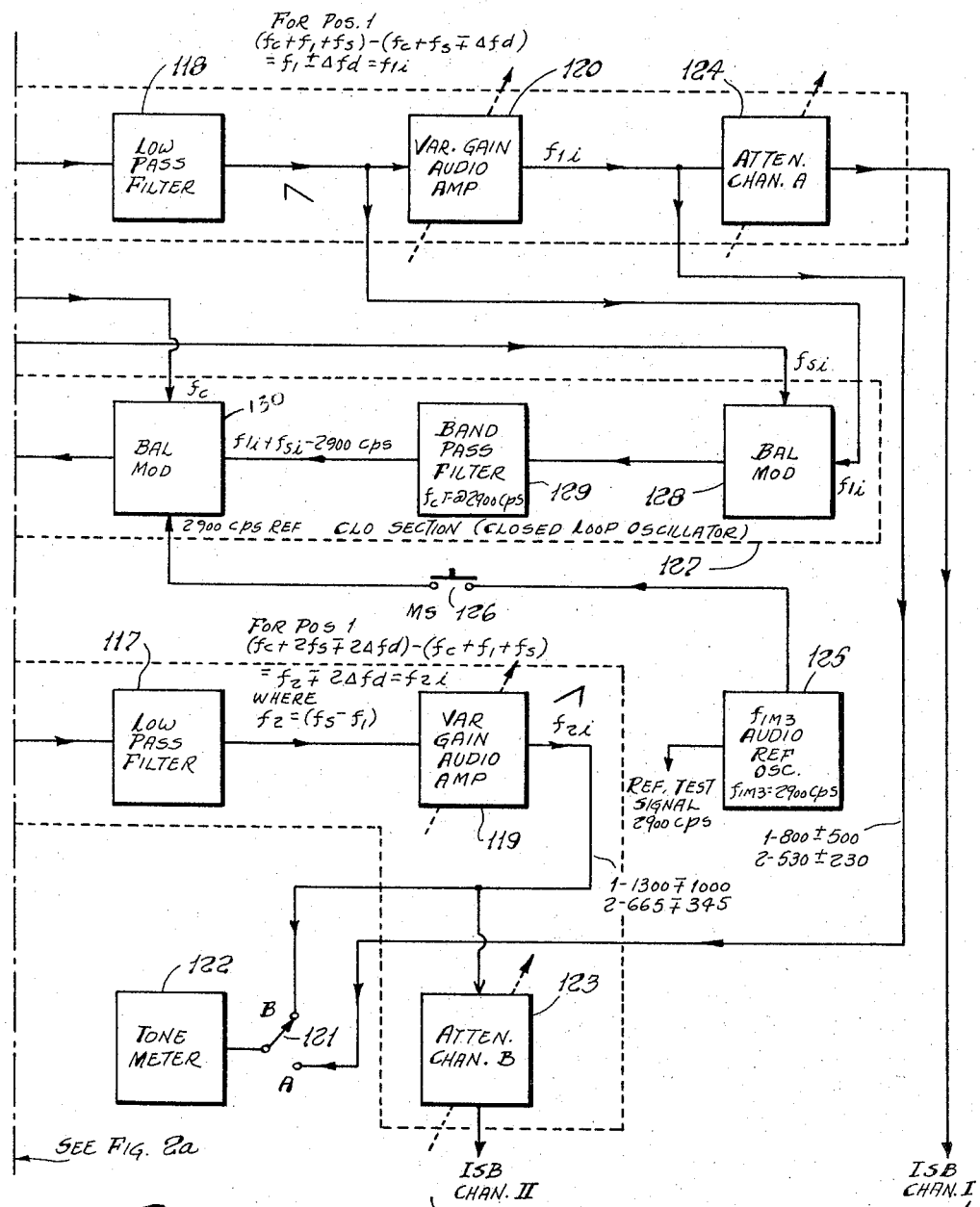

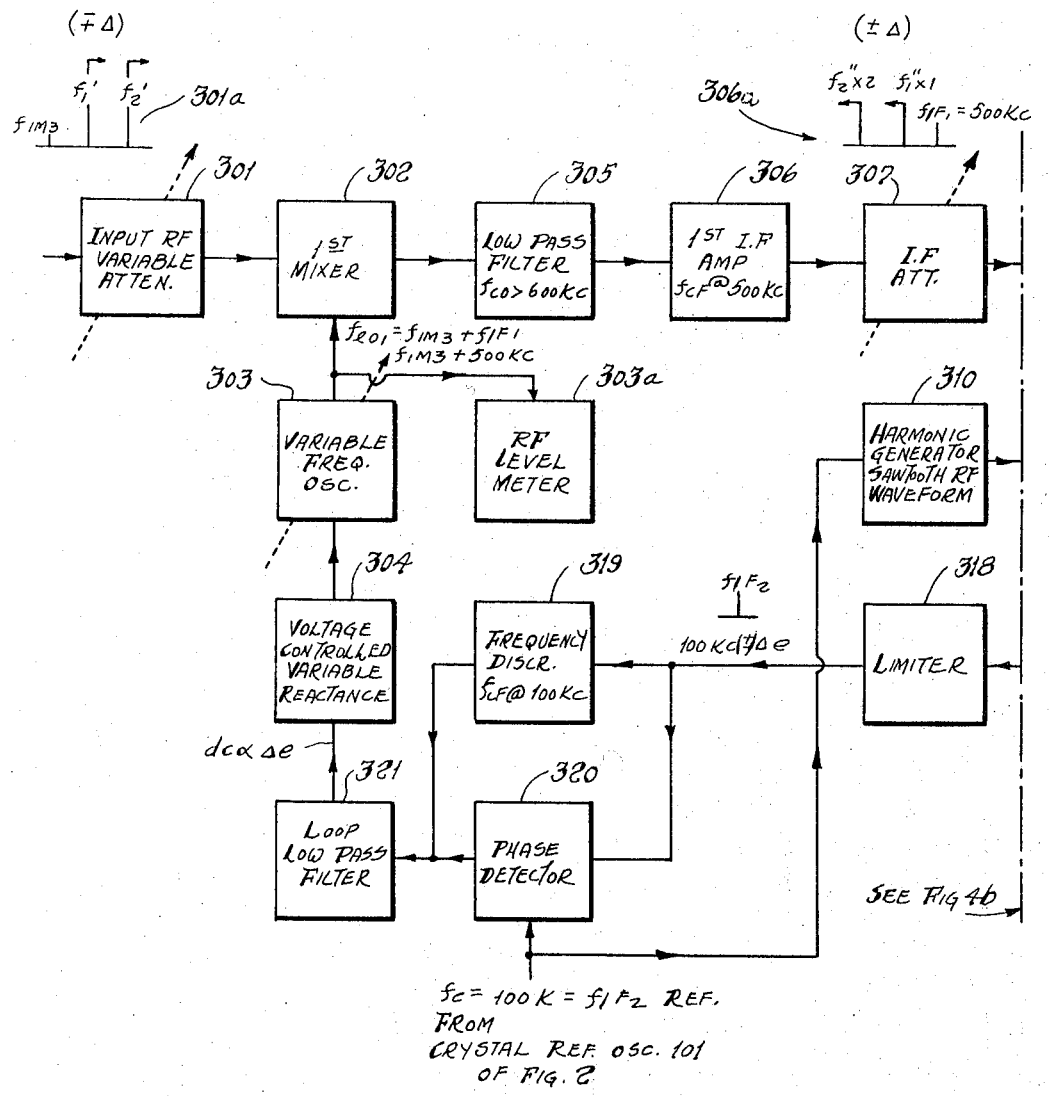

INVENTOR.
ANTHONY C. PALATINUS

ATTORNEYS

United States Patent Office 3,360,729
Patented Dec. 26, 1967

3,360,729
INTERMODULATION DISTORTION TEST SET FOR INDEPENDENT SIDEBAND TRANSMITTERS
Anthony C. Palatinus, 68—17 60th Road, Maspeth, N.Y. 11378
Filed Aug. 27, 1965, Ser. No. 483,380
11 Claims. (Cl. 325—133)

ABSTRACT OF THE DISCLOSURE

The apparatus for indicating the distortion introduced by the common stages of an ISB transmitter includes a two-tone generator whose output consists of a pair of tones sweeping in opposition and one at twice the width of the other. These outputs are individually applied to the inputs of the transmitter channels whose output in turn is translated down about some intermediate frequency. This first translated output is still further down frequency converted about some lower second intermediate frequency, resolved and then detected and amplified. The detected signal is applied to one deflection system of an indicator such as an oscilloscope while the other input receives a sawtooth voltage whose sweep rate is equal to the rate of the originally generated sweep tones. The indicator displays visually the distortion introduced by the transmitter as a function of frequency.

---

The invention described herein may be manufactured and used by or for the Government of the United States of America for governmental purposes without the payment of any royalties thereon or therefor.

The present invention relates to methods of, and apparatus for, the test and measurement of linearity characteristics of the common IF–RF stages of Independent Sideband transmission systems, and the like, over their channel bandwidth extending over a wide frequency range. Of further concern to this invention are the techniques and circuitry for automatic frequency control and stabilization of high frequency translation operations within such test apparatus. More specifically, this invention embodies techniques of intermodulation distortion analysis, and in particular, the determination of the amplitude variation relationship of 3rd and 5th odd order intermodulation component terms over the common IF–RF bandpass region of the particular ISB transmission system under test.

Additionally, the present invention involves automatic control techniques for the precise and stable frequency translation of high frequency response spectrums resulting from the passage therethrough of a non-stationary two-tone type test signal, wherein both the individual tones absolute frequency values and the frequency difference between them are linearly varied with time.

In my copending application "Intermodulation Spectrum Analyzer" Serial No. 395,965, filed September 11, 1964, unique use is made of a non-stationary two-tone test signal wherein the two frequencies are changing linearly with time, but the frequency difference is maintained constant during the course of a scan cycle. As pointed out in my prior application, such a unique test signal is of great value, and, in conjunction with the disclosed test apparatus of this prior application, significantly useful data is readily secured in testing of electrical devices.

Now it is well known in the electronics art that the distortion content of a linear power amplifier is related to the load impedance. Optimum linearity at a rated power level is a function of a particular load impedance value, and the load impedance itself is a function of frequency. A static two-tone test (that is, two constant but differing signal frequencies of equal amplitude) is standard in SSB communications linearity measurements, but supply only a limited amount of distortion data from one pair tone application. Hence two tone generators, either audio frequency or RF, supply a selection of numerous tone combinations wherein a series of static tests can be made to obtain an evaluation of distortion content with respect to the frequency region. Even in the very narrow channel of SSB transmission only, a quantity of such measurements must be made and the process is tedious and time consuming. For the wider channel condition of ISB–SSB transmission, a greater need exists for multiple data within the total channel bandwidth, and to secure such data in a rapid and repeatable manner, automatic means need to be considered.

The operation of ISB–SSB transmission is one of complete bandwidth utilization in that the two sideband channels are activated with separate type modulation information being supplied from independent sources. Prior means for evaluation of such transmission capability center on static tone inputs.

To supplement distortion evaluation data from static tone test response, a rapid test approach is desired. Now it is commonly found that the response of a quasi-linear transfer function to a two-tone signal generates, for narrow bandwidth channels, odd order IM intermodulation distortion product terms that fall within the useful bandwidth. Usually the lowest IM terms, the 3rd odd order, is of a larger magnitude than the 5th, 7th, etc.

Indeed, at times the level of the 3rd product is often used in the determination of the signal-to-noise ($S/N$) ratio. Hence, it is advantageous to concern the rapid test approach to this primary distortion term, the main 3rd odd order product generally expressed as ($2 \times f$ lowertine—$f$ highertone) and ($2f$ highertone—$f$ lowertone). Since usually the amplitude relationships of odd order terms above and below the main tone pair are symmetrical and equal, only one IM term need be measured. Taking the lower 3rd odd order term as the major IM distortion component of immediate and fairly indicative importance, as is the usual case, then setting about to achieve an accurate and useful recording of the response of this major or main IM term over the common bandwidth region of the overall ISB–SSB system in a rapid and repeatable manner becomes a primary objective of this invention.

The static nature of the prior art test methods, besides requiring numerous tests to gather data over a bandwidth region, also require fairly complex frequency scanning spectrum analyzers that are limited in dynamic range and resolution due to the possible development therein of ringing distortion. Such swept frequency spectrum analysis resolves the IM terms and main tones with the spectrum responses being individually displayed on the same screen pattern. This results in IM term amplitude relationships that are difficult to accurately ascertain with respect to one another and the main tone amplitude especially where the relationship approaches 40 db or higher, and more so where the audio frequency separation between the tones is rather small. It is therefore desirous to secure an analysis, measurement, and display means for the proper signal processing of the IM terms of interest over a wide dynamic range with high selectivity and great resolution.

A survey of present state of the art SSB transmission systems reveals the lack of a standardized common carrier frequency value that governs the designation of the first intermediate frequency. While a 100 kc. frequency value is given only as an example, herein, other presently widely used common carrier frequency values include 250 kc., 500 kc., 1.75 mc. It is therefore advantageous to apply a test technique that is independent of the particular carrier frequency value in use thus eliminating the necessity of providing cumbersome and complex RF tuning of the test signals being generated.

An additional object of this invention is to provide a method and apparatus for the generation of a dual sweep two frequency test signal emanating from a single sweep frequency modulated source.

Another object of this novel technique of duel sweep IM test of ISB transmission systems, and the invention means of the ISB–IM Distortion Test Set, is to provide a method and apparatus for the evaluation of the distortion characteristics of common IF–RF stages of ISB transmitters in producing the response traceout on a CRT screen of the intermodulation components over a frequency region encompassing its channel bandwidth.

A still further object of this invention is to provide automatic establishment and repeatability of the swept frequency ratio between two separate test signal inputs and the subsequent plotting of the intermodulation response of the common stages of an ISB transmission system resulting from this specific type test signal input.

It is an additional object of this invention to provide stabilized frequency translation of the transmission system's response output in an automatic manner.

Other objects and advantages will appear from the following description of an embodiment of the present invention, and the novel features will be particularly pointed out in the appended claims.

This invention discloses a derived overall technique of HF–ISB intermodulation distortion analysis, and in particular, for the determination of the odd order intermodulation term amplitude variation over the common bandpass region of the particular ISB transmission system under test. Of recent date in communications art, it is becoming increasingly conventional to provide HF (2–30 mcs.) single sideband transmission systems which are capable of various well-known modes of amplitude modulation. To facilitate such performance, that is modulation modes of single sideband only (upper or lower sideband) (SSB), and more particularly independent sideband (ISB), the modulator (or in some cases know as the exciter) consists of two modulation inputs that are separate and accordingly fed to separate channel modulators. Thereafter, the two different sidebands are linearly combined by summation and accordingly frequency translated to the high frequency region for linear power RF amplification and transmission. This present inventive technique features a unique method of evaluating the transmission characteristic of such SSB–ISB transmitters with respect to the linearity of their common IF–RF stages that is independent of the specific IF value of the transmitter. It is generally well known that a static two tone test signal, consisting of frequency values, $f_1$ and $f_2$, where $f_1$ represents the lower main excitation tone and $f_2$ being the upper main excitation tone, separated from each other by an audio frequency interval $\Delta f_a$, each tone being of equal amplitude; when applied to a system to be tested, then develops new frequencies in the output of the tested system due to existing degrees of non-linearity within the bandpass region of the system. These new frequencies are designated intermodulation products, and their relative amplitude with respect to the main tone is referred to as "intermodulation distortion."

The closest new frequencies that locate themselves about the main tone frequency locations are commonly known to be the odd order difference frequency terms, and they are conventionally in the form of 3rd odd order terms as $(2f_1-f_2)$ and $(2f_2-f_1)$; 5th odd order terms as $(3f_1-2f_2)$ and $(3f_2-2f_1)$; and so forth in the manner whereby a $(M+N)$ odd order term is $(Mf_1-Nf_2)$ and $(Mf_2-Nf_1)$. In single sideband systems, wherein the bandwidth of the system is relatively narrow, only the closest odd order terms come within the useable sideband or fall into the adjacent sideband and are of the most paramount interest.

These odd IM terms are usually of the 3rd and 5th order, with the 3rd order term being of higher importance. Accordingly, in the measurement of some SSB systems, wherein the 3rd order predominates in being substantially more than the 5th, etc., then the comparison of the signal level to the 3rd order level serves to provide an indication of the signal to distortion $(S/D)$ ratio of the system. It is common to find the higher order terms of a lower amplitude than the 3rd order, which is the lowest order. Hence, many times, a rapid and equally useful indication of the degree of system linearity can be satisfactorily derived by sole consideration of the 3rd odd order IM term. Here, as in most common applications, the 3rd upper term of $(2f_2-f_1)$ is of equal amplitude as the 3rd lower term of $(2f_1-f_2)$. It is of greater benefit to select the measurement technique with the 3rd lower odd order IM term of $(2f_1-f_2)$ due to the lower frequency value at which it exists.

The lower 3rd odd order IM term from a two tone test of $f_1$ and $f_2$, separated by $\Delta f_a$, is located at a frequency value that is less than the lower main excitation frequency value by the interval, $\Delta f_a$, and has the absolute frequency value equal to the difference of twice the frequency of the lower main excitation tone from the upper main excitation tone frequency value, where $$f_{\text{LIM3}}=2f_1-f_2=f_1-\Delta f_a$$

Now consider the situation where the lower main tone of $f_1$ is varied at a linear rate with time and simultaneously the audio frequency difference interval between this lower $f_1$ varying tone and the upper main tone of $f_2$, that is, $\Delta f_{a1}$ is set to vary with time in a linear manner by a proportionate frequency amount such that the initial value of $f_{\text{LIM3}}=(f_{11}-\Delta f_{a1})=(2f_{11}-f_{21})$ is constantly maintained at its fixed value during the changing interval.

Observe now, a tone frequency $f_1$ which increases by an amount say $\Delta$ c.p.s. to become $(f_1+\Delta)$, and the initial difference frequency separation value of $\Delta f$ c.p.s. for a second tone frequency $f_2$ also increasing by equal amount, to say $(\Delta f+\Delta)$. Then the third odd order resulting IM term frequency value becomes $(f_1+\Delta)-(\Delta f+\Delta)$ or $IM_{3L}=(f_1-\Delta f)$ and is therefore of a constant frequency. In a like manner for the 5th IM term frequency, where $f_1$ increases by $\Delta$ value and $\Delta f$ increase by $\Delta/2$ amount, then $$f_1+\Delta-2(\Delta_f+\Delta/2)=f_1-2\Delta f=IM_{5L}$$

For $\Delta f$ and $f_1$ to increase by like amount of $\Delta$, $f_2$ must increase at twice the amount or $2\Delta$.

For $\Delta f$ to increase at one-half the amount of $f_1$'s increase, $f_2$ must increase at 3/2 amount of $f_1$. Hence to obtain a fixed frequency location, for $IM_3$ the sweep tones become $f_1\pm\Delta f_d$ and $f_2\pm 2\Delta f_d$; and for $IM_5$ the sweep tones become $$f_1\pm\Delta f_d \text{ and } f_2\pm 3/2\Delta f_d$$

where $(\Delta f_d)$=sweep frequency deviation. Accordingly, $$2(f_1+\Delta)-(f_2+2\Delta)=2f_1-f_2=IM_3$$

and $$3(f_1+\Delta)-2(f_2+3/2\Delta)=3f_1-2f_2=IM_5$$

In accordance with the above frequency deviation relationships, the dual sweeping test signals input to the ISB transmission system under test are thereupon so generated and applied by way of the present invention.

In the accompanying drawings,

FIGS. 2a and 2b are a detailed block diagram embodiment of a circuit arrangement for the generation of a sweeping two-tone test signal in accordance with the invention.

FIGS. 4a and 4b are a block diagram of the circuit arrangement for the analysis of the transmitter output and illustrating the technique of automatic frequency stabilization in the frequency translation operation.

*Elements of overall technique*

Figure 1A:
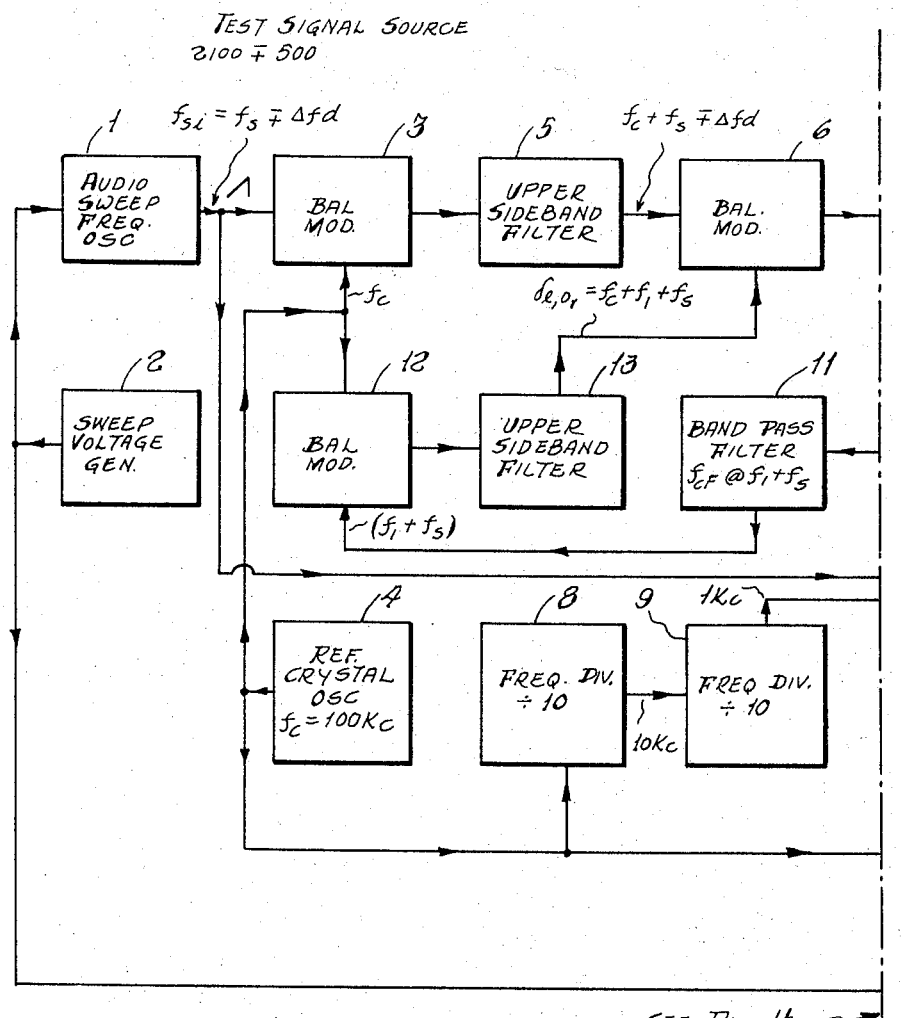
FIGS. 1a and 1b are an elementary block diagram of an embodiment illustrating the novel circuits arrangement for the overall implementation of the unique technique of ISB-IM distortion measurement in accordance with the invention.
Figure 1B:
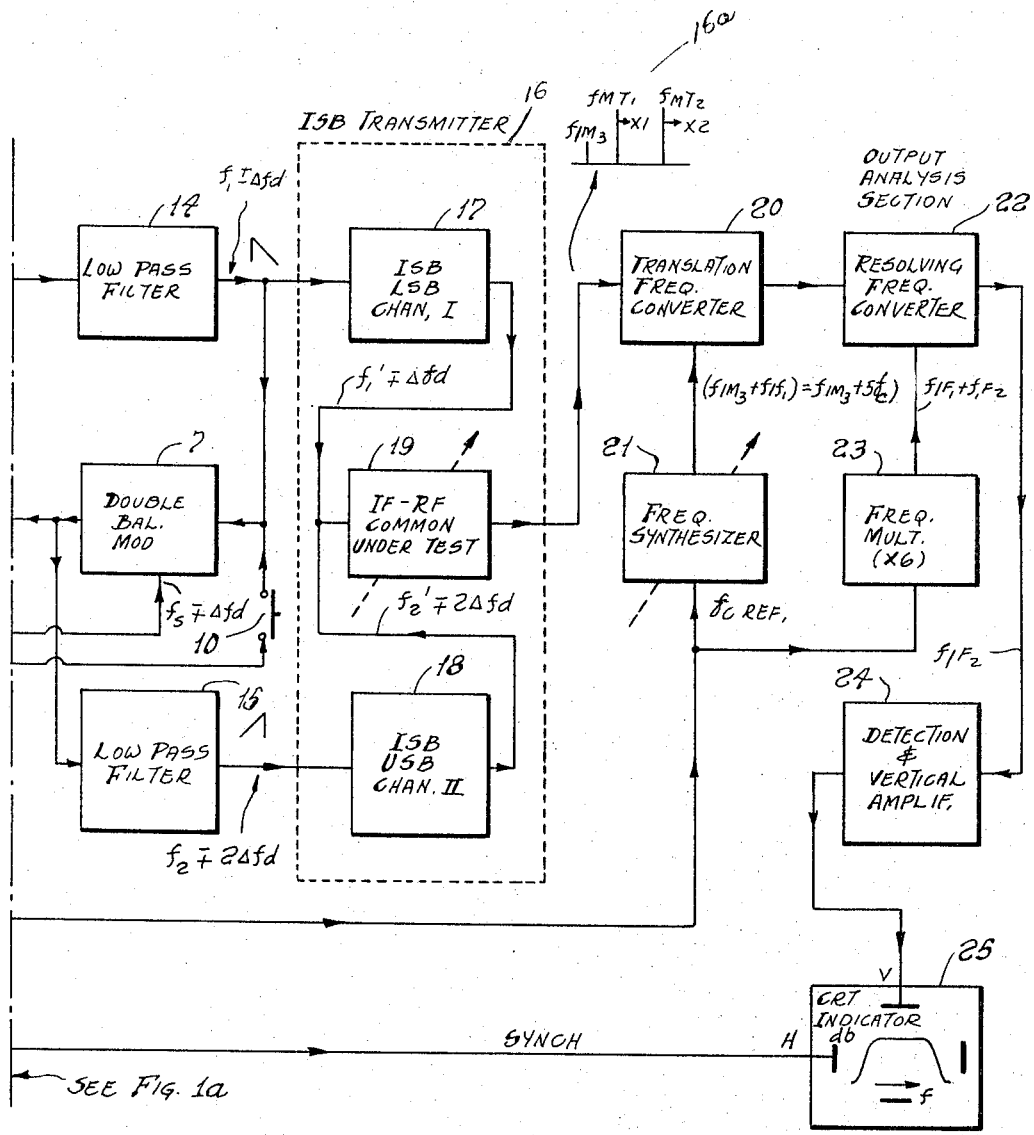

FIG. 1 serves to illustrate one embodiment of the invention useful in the measurement of a constant IM$_3$ term. Audio sweep frequency oscillator 1 generates a linear frequency modulated signal, $f_{si}=(f_s \mp \Delta f_d)$, where the ($\mp$) designation defines positive slope direction of change, upon being modulated by the linear sawtooth voltage from the sweep voltage generator 2 applied to its modulating element. The sweep voltage output of sweep generator 2 is also fed over a second path to the horizontal or X-axis input of CRT indicator 25 for synchronization.

Sweep frequency signal $f_{si}$ is applied over one path to the signal input of balanced modulator 3 and fed over a second path to one input of double balanced modulator 7. Reference crystal oscillator 4 generates a carrier frequency signal, $f_c=100$ kc., which is fed over five paths. A first and a second path supply signal, $f_c$, as the common local oscillator signal to the carrier inputs of balanced modulator 3 and balanced modulator 12.

A third path connects $f_c$ to the input of $\div 10$ frequency divider 8. A fourth path feeds $f_c$ as a reference signal to frequency synthesizer 21. The final path applies $f_c$ to ($\times 6$) frequency multiplier 23.

Considering first the common carrier input to balanced modulator 3, then sum and difference frequency products develop at modulator 3 output and are fed to upper sideband filter 5. USB filter 5 passes unattenuated the sum product term of $(f_c+f_s \mp \Delta f_d)$ and readily suppresses all other modulator 3 output components. The output of USB filter 5 becomes the input signal of balanced modulator 6, which has carrier signal $f_{lo}=(f_c+f_1+f_s)$ applied to it from the output of USB filter 13. This carrier signal is produced momentarily as follows:

Reference frequency $f_c=100$ kc. is divided by a factor of 10 in frequency divider 8. This 10 kc. signal output is then further divided by a factor 10 in frequency divider 9 to become a 1 kc. signal at the output of divider 9, which is connected to one contact of momentary normally open switch 10. The other contact of MS10 connects to the other remaining input of double balanced modulator 7. Upon the closing of MS10, the 1 kc. signal is thereupon mixed with the other input signal to double balanced modulator 7 of $f_s \mp \Delta f_d$. The sum and difference products appear at modulator 7 output and feed to the input of bandpass filter 11. Thereupon bandpass filter 11, which is selectively tuned to pass only the sum frequency component $(f_1+f_s)$ and reject all other components, produces an output signal at that moment in time when $(f_s \mp \Delta f_d+1$ kc.$)=(f_1+f_s)$. In the course of the sweep frequency excursion, the equality does occur and the bandpass filter 11 output of $(f_1+f_s)$ is fed to the signal input of balanced modulator 12. The sum and difference frequencies develop in modulator 12 output and upper sideband filter 13 passes only the sum frequency product of $(f_c+f_1+f_s)$, to become the carrier signal to balanced modulator 6.

Thereupon, sum and difference products develop in modulator 6 output and feed to the input of low pass filter 14. The output of low pass filter 14 passes only the difference frequency product of $$(f_c+f_1+f_s)-(f_c+f_s \mp \Delta f_d)$$

which becomes $(f_1 \pm \Delta f_d)$ giving a reversal of the direction of sweep. This sweep frequency output of low pass filter 14 is applied over two paths. One path serves as one test input signal for the ISB-LSB channel I17 of Independent Sideband Transmitter 16. The second path connects to the same input of double balanced modulator 7 to which the momentary 1 kc. signal is applied. With the momentary switch 10 open, the resultant sum frequency product of double sideband modulator 7 becomes $(f_s \mp \Delta f_d)+(f_1 \pm \Delta f_d)=(f_1+f_s)$, whereby the sweep frequency excursion has been negated or deleted. Bandpass filter 11 passes the $(f_1+f_s)$ signal and the feedback loop is now self sustained and results in the stable generation of the carrier signal $f_{lo}=(f_c+f_1+f_s)$. Double balanced modulator 7 also develops the difference frequency product of $(f_s \mp \Delta f_d)-(f_1 \pm \Delta f_d)$ which becomes $$(f_s-f_1) \mp 2\Delta f_d$$

This sweep frequency signal of twice the frequency excursion is passed by low pass filter 15 and at filter 15 output is $f_2 \mp 2\Delta f_d$ where $f_2=(f_s-f_1)$. This output ($f_2$ instantaneous) serves as the other test signal input to ISB transmitter 16 in being applied to ISB-USB channel II18. Note here that the frequency deviation is being doubled by additive means and of particular note, only one audio sweep oscillator and one reference crystal oscillator is employed. The nature of this type of signal frequency generation will become apparent by way of the subsequent description of the signal processing in the second example embodiment illustrated in FIG. 2.

ISB transmitter 16 in elementary form comprises ISB-LSB channel I17, ISB-USB channel II18, and IF-RF common stages under test 19, which is properly terminated in a dummy load with the power output being monitored. Test signal input $(f_1 \pm \Delta f_d)$ is translated and inverted in ISB-LSB channel I17, to appear at its output $f_11 \mp \Delta f_d$, wherein $f_11=f_0-f_1$, $f_0$ being the carrier signal common to the two ISB channels of transmitter 16. In the case of test signal input $(f_2 \mp 2\Delta f_d)$, the translated output of ISB-USB channel II is not inverted and is expressed as $f_21 \mp 2\Delta f_d$, where $f_21=f_c+f_2$. The combining of the two channel outputs at the input to IF-RF common under test 19 results in a two frequency signal of mean frequency value $$f_m = \frac{(f_21 \mp 2\Delta f_d)+(f_11 \mp \Delta f_d)}{2} = \frac{(f_21+f_11)}{2} \mp \frac{3}{2} \Delta f_d$$

and of difference or separation frequency value $$\Delta F_i=(f_21 \mp 2\Delta f_d)-(f_11 \mp \Delta f_d)=(f_21 \mp f_11) \mp$$

$$\Delta f_d, \Delta F_i = [f_2+f_1 \mp \Delta f_d] \left[ \frac{(f_c+f_2+f_0-f_1)}{2} \mp \right.$$

$$\left. \frac{3}{2} \Delta f_d \right] = f_m$$

when substitution is made for the primes.

Finally $$\Delta F_i = f_c + \frac{\Delta f}{2} \mp \frac{3}{2} \Delta f_d$$

where $\Delta f=f_2-f_1$. Note in the given example, $f_{si}=2100 \mp 500$ c.p.s. generated by audio sweep oscillator 1 of FIG. 1 is equivalent to the frequency variation with time of the audio difference frequency between the two sweeping tones, that is, $$f_{si}=\Delta F_i=f_{21}+f_{11}=f_2+f_1 \mp \Delta f_d$$

ISB modulation provides for the signal processing of sweeping test signal inputs as described in the following manner:

The linear swept audio frequency wave that has an excursion from a higher frequency value to a lower frequency value with time of negative going direction is applied to the ISB LSB channel input. The balanced modulator of channel I heterodynes this type input with the much higher frequency valued local (carrier) oscillator signal $f_{co}$. The double-sideband suppressed carrier output is then applied to the lower sideband (LSB) filter wherein the upper sideband is suppressed. The resultant output being aplied to linear combining stage thru LSB channel I17 path then becomes a single sweeping tone from the high frequency portion of the LBS channel towards the virtual suppressed carrier frequency value; and when combined, functions as the lower main tone of the sweeping variation of the two tone type test signal that functions as the common test signal, from this point on.

Simultaneous with the above described action, a linear swept audio frequency wave that has an excursion from a lower frequency value to a higher frequency value ($f_2$) with time (i.e. positive going direction and opposite of ($f_1$) above) is applied to the ISB USB channel input II, 18. The balanced modulator of channel II heterodynes this type input with the same local (carrier) oscillator signal mentioned above; in this case, the double sideband suppressed carrier output is then applied to the upper sideband (USB) filter wherein the lower sideband is suppressed. Here the resultant output being applied to linear combining stage thru LSB channel 2 path becomes a single sweeping tone from the low frequency portion of the USB channel away from the virtual (suppressed) carrier frequency value; and when combined, functions as the upper main tone of the sweeping tone pair that is now so derived to develop the main IM terms (3rd) of constant frequency where non-linearity is experienced.

It is here evident that while the audio sweep frequency test tones are separately applied to the ISB channel inputs, the ISB type SSB transmission system functions to linearly combine these sweeping tones in the linear combining (i.e. summation) stage of the transmitter to thereafter act as the desirable sweeping frequency tones combination to be applied to the remainder of the system, that maintains the constant fixed frequency location (value) of the IM term of interest, in the case of this example, the 3rd lower odd order term.

The further frequency translation occurring after the linear combining operation within the ISB transmission system, which conventionally involves heterodyning with highly stable and accurate frequency synthesizer controlled local oscillator signals, serves to up-convert the sweep test signal spectrum and its accompanying related IM terms to the high frequency (2–30 mc.) region for which the transmitter is tuned. While the absolute frequency values of the sweeping tones are changed in an equal manner, the linear sweep variation of these tones is maintained in accordance with the manner which they were initially supplied in the audio region by the test signal source.

Since the channel bandpass regions of ISB–SSB systems are set to suppress the undesired sideband and the carrier, very steep sides are exhibited by the filter characteristics, particularly so by SSB filters which are asymmetrical in response shape. The more rapidly attenuated region in being close to the carrier, location at the low frequency of the bandpass region for USB; at the higher frequency for the LSB filter unit.

Consider an analysis of the test signal processing as follows:

The sweep signal signal $f_{1i}$ ($i$=instantaneous) applied to ISB #1 channel balanced modulator, which is supplied by local oscillator carrier frequency, $f_{co}$, provides at the output the following double sideband relationship of:

(1) Lower Sideband (difference): $f_{o1sb1L}=f_{co}-f_{1i}$. Now $f_{1i}=f_{1cf}\pm\Delta f_{d1}$ (negative slope). Thus $f_{o1sb1L}=(f_{co}-f_{1cf})\mp\Delta f_{d1}$ (inverted).

(2) And Upper Sideband (sum): $f_{o1sb1u}=f_{co}+f_{1i}$. Hence $f_{o1sb1u}=(f_{co}+f_{1cF})\pm\Delta f_{d1}$. Thereafter the lower sideband is selected and the upper sideband and carrier suppressed.

Likewise for ISB #2 channel balanced modulator, supplied by loc. osc. carrier frequency $f_{co}$, the signal processing of sweep signal $f_{2i}=f_{2cF}\mp\Delta f_{d2}$ (positive slope) is as follows:

(1) Lower Sideband (difference) $f_{o1sb2L}=f_{co}-f_{2i}=(f_{co}-f_{2cf})\pm\Delta f_{d2}$ (inverted).

(2) And Upper Sideband (sum) $f_{o1sb2U}=f_{co}+f_{2i}=(f_{co}+f_{2i})+\Delta f_{d2}$.

Thereafter, the upper sideband is selected and the lower sideband and carrier suppressed.

Hence, the linear combining network of the ISB–SSB system sums the "sidebanding" signals as follows:

Signal combination instantaneous of $f_{o1sb1L}$ and $f_{o1sb2L}$ combined or $(f_{co}-f_{1cf}\mp\Delta f_{d1}$, and $(f_{co}+f_{2cF})\mp\Delta f_{d2}$ in the course of a cyclic variation of the frequencies with time.

The 3rd odd order difference frequency, $f_{3IM}$ lower, is expressed as $f_m+n=mf_1-nf_2$, where $m>n$, $m=2$, $n=1$; $f_{3IM}=2f_1-f_2$.

Now wherein inversion is produced in the sidebanding process: $f_2$ becomes negative giving: and $f_{3IM}=2f_1+f_2$.

On an instantaneous basis:

$$f_{3IM}=2f_{1i}+f_{2i}=2[f_{1cf}\pm\Delta f_{d1}]+[f_{2cf}\mp\Delta f_{d2}]$$
$$=2f_{1cf}+f_{2cf}\pm2\Delta f_{d1}\mp f_{d2}$$

Let $\Delta f_{d2}=2\Delta f_{d1}$

Then $f_{3IM}=2f_{1cf}+f_{2cf}\pm2\Delta f_{d1}\mp2\Delta f_d$

Thus $f_{3IM}=$Constant$=2f_{1cf}+f_{2cf}$

5th IM Term Sweeping Relationship is as follows:
Let equal amplitude LSB input signal (a) be $$f_{ai}=f_{acf}\pm\Delta f_{da}$$

USB input signal (b) be $f_{bi}=f_{bcf}\mp\Delta f_{db}$. For 5th odd order: $fm+n$ for $m=3$, $n=2$; $f_{5IM}=3f_a-2f_b$. With sideband inversion: $f_{5IM}=3f_a+2f_b$. On an instantaneous basis:

$$f_{5IM}=3f_{ai}+2f_{bi}$$
$$=3[f_{acf}\pm\Delta f_{da}]+2[f_{bcf}\mp\Delta f_{db}]$$
$$=3f_{acf}+2f_{bcf}\pm3\Delta f_{da}\mp2\Delta f_{db}$$

Let $$\Delta f_{db}=\frac{3}{2}f_{da}$$

$$\left(\text{or }\Delta f_{da}=\frac{2}{3}\Delta f_{db}\text{ as alternate}\right)$$

Then $$f_{5\,IM}=3f_{acF}\pm3\Delta f_{da}\pm2\left(\frac{3}{2}\Delta f_{da}\right)+2_{bcF}$$

Thus $f_{5IM}=$constant$=3f_{acF}+2_{bcF}$.

Setting the 3rd IM for within bandpass of the system:

Let flat SB bandwith=300–3000 c.p.s.=2700 c.p.s.
Let 3rd lower odd term be located at edge of lower side band channel bandwith, i.e., $f_{f3IM}=$constant$=2900$ c.p.s.$=2f_{1cF}+f_{2cF}$.

Range of allowable bandwidth of USB=2700 c.p.s.
For a practical case, let the sweep width within upper sideband=2000 c.p.s.
$SW_2=2$ kc.; $\Delta f_{d2}=1000$ c.p.s.
Therefore $SW_2=2SW$, or $SW_1=\frac{1}{2}SW_2=1000$ c.p.s. or $\Delta f_{d1}=500$ c.p.s.

Let the upper sideband sweep start at the lower frequency limit of the pass band i.e. $f_{s2}=300$ c.p.s., then the terminating frequency value $f_{t2}=300+2000=2300$ c.p.s. and the center frequency value is $$f_{cF2}=300+1000=1300 \text{ c.p.s.}$$

For $f_{cF1}$; $f_{3IM}=2900$ c.p.s.$=2f_{1cF}+f_{2cF}$ $$f_{1cF}=\frac{2900-1300}{2}=800 \text{ c.p.s.}$$

Hence $f_{1i}=f_{1cF}\pm\Delta f_{d1}=800$ c.p.s.$\pm500$ c.p.s. and $f_{2i}=f_{2cf}\mp\Delta f_{d2}=1300$ c.p.s.$\mp1000$ c.p.s.

Since for IM 5th terms, it is advantageous to sweep within the same region as for the 3rd and maintain the same IM term location, thus $$f_{5IM\text{ lower}}=2900 \text{ c.p.s.}=3f_{1cF}+2f_{cF}$$

Let the LSB sweep signal be terminated at the higher frequency value within the band such that $f_{1F}=300$ c.p.s.

One determines the corresponding termination frequency of $f_{2F}$ as: 2900 c.p.s.$=3f_{1F}+2f_{2F}=3(300)+2(f_{2F})$ $$f_{2F}=\frac{2900-900}{2}=1000 \text{ c.p.s.}$$

Now for the maximum lower limit of $f_2$, or $(f_{2s})=300$ c.p.s. Thus $SW_2=1000-300=700$ c.p.s., $SW_1=\frac{2}{3}SW_2=467$. Thus at start $$2900=3f_{1s}+2f_{2s}$$
$$=3f_{1s}+2(300)$$
$$f_{1s}=\frac{2900-600}{3}=767$$

For
$$\Delta f_{d1}=SW1/2=467/2=234 \text{ and}$$
$$\Delta f_{d2}=SW2/2=700/2=350$$

Thus
$$f_{1cF1}=f_1+\Delta f_{d1}=300+234=534$$
and
$$f_{2cF2}=f_{2s}+\Delta f_{d2}=300+350=650$$
$$f_{5IM}=2900=3(535)+2(650)=2902 \text{ c.p.s.}$$

The c.p.s. discrepancy is due to the odd SW values. Thus $f_{11}=524$ c.p.s.$\pm 234$ c.p.s. and $f_{21}=650$ c.p.s.$\mp 350$ c.p.s. A more rounded sweep excursion as given in the example is expressed as $f_{11}=530$ c.p.s.$\pm 230$ c.p.s. and $f_{21}=655\mp 345$ c.p.s.

To determine the numerical absolute frequency value at $t=T/2$ (½ the period of the sweep cycle of the two seeping tones present, i.e., signal 1 and 2)

$$f_{oIsb1L}=(f_{co}-f_{1cf}) \text{ and } f_{oIsb2u}=(f_{co}+f_{2cf})$$

where
$$\mp \Delta f_{d1}=0 \text{ and } \pm \Delta f_{d2}=0$$

For $f_{co}=100$ kc., $f_{1cf}=800$ c.p.s. and $f_{2cf}=1300$ c.p.s. Then
$$(f_{co}-f_{1cf})=100 \text{ kc.}-.8 \text{ kc.}=99.2 \text{ kc.}$$
$$(f_{co}+f_{2cf})=100 \text{ kc.}+1.3 \text{ kc.}=101.3 \text{ kc.}$$

Thus, in accordance with the established theory of this invented technique: For IM odd order term, 3rd lower difference frequency $f_{a3IML}=2f_{1a}-f_{2a}$ (absolute) or $2f_1+f_2$ (relative) $=f_{r3IML}$. At $t=T/2$, relative $$f_{r3IML}=2f_{1cf}+f_{2cf}=2(800)+1300=2900 \text{ c.p.s.}$$

For absolute:
$$f_{a3IML}=2(f_{co}-f_{1cf})-(f_{co}+f_{2cf})$$
$$=2f_{co}-2f_{1cf}-f_{co}-f_{2cf}$$
$$=f_{co}-2f_{1cf}-f_{2cf}=f_{co}-(2f_{1cf}+f_{2cf})$$
$$=100 \text{ kc.}-2900 \text{ c.p.s.}=97.1 \text{ kc.}$$

or
$$f_{a3IML}=2(f_{co}-f_{1cf})-(f_{co}+f_{2cf})$$
$$=2(99.2 \text{ kc.})-(101.3 \text{ kc.})$$
$$=198.4K-101.3K=97.1 \text{ kc.}$$

Thus, relative to the virtual carrier frequency value of $f_{co}=100$ kc.

$f_{R3IM}=T/2=f_{co}-f_{3IM \text{ abs.}}=100$ kc.$-97.1$ kc.$=2900$ c.p.s.

Similarly, for the IM odd order term, 5th lower difference frequency gives: Absolute $f_{a5IML}=3f_{1a}-2f_{2a}$ or Relative $f_{R5IML}=3f_1+2f_2$. With $t=T/2$ $f_{1cf}=530$, $f_{2cf}=655$, and $f_{11}=f_{1cf}+\Delta f_{d1}=530$ c.p.s.$\pm 230$ c.p.s., and $$f_{21}=f_{2cf}\mp \Delta f d_2=655 \text{ c.p.s.}\mp 345 \text{ c.p.s.}$$

Let the 5th IM term relative frequency=3rd rel$_{IM}$ or $f_{R5IM}=2900$ c.p.s.$=3f_{11}+2f_{21}$: At $t=T/2$, $$f_{R5IML}=3f_{1cf}+2f_{2cf}=3(530)+2(655)$$
$$=1590+1310=2900 \text{ c.p.s.}$$

For Absolute, $f_{oIsBIL}=(f_{co}-f_{1cf})$ and $f_{oIsB2U}=(f_{co}+f_{2cf})$ at $t=T/2$ or $\Delta f_{d1}=\Delta f_{d2}=0$. For $f_{co}=100$ kc.:

$$(f_{co}-f_{1cf})=100 \text{ kc.}-.530 \text{ kc.}=99.470 \text{ kc.}$$

and $(f_{co}+f_{2cf})=100$ kc.$+.655$ kc.$=100.655$ kc. Thus $$f_{a5IML}=3(f_{co}-f_{1cf})-2(f_{co}+f_{2cf})=$$
$$3(99.470 \text{ kc.})-2(100.655 \text{ kc.})$$
$$=298.41 \text{ kc.}-201.31 \text{ kc.}=97.1 \text{ kc.}$$
$$=3f_{co}-3f_{1cf}-2f_{co}-2f_{2cf}$$
$$=f_{co}-3f_{1cf}-2f_{2cf}=f_{co}-(3f_{1cf}+2f_{2cf})$$
$$=f_{co}-f_{5IML \text{ relative}}=100 \text{ kc.}-2.9 \text{ kc.}=97.1 \text{ kc.}$$

Typically, the ISB transmitter 16 is tunable over the high frequency region of 2–32 mc. Non-linearities that exist in the IF-RF common stages under test 19 result in the production of intermodulation products of the two frequency input signal which appear in the ISB transmitter 16 response output. As noted earlier a constant frequency signal develops for the lower third odd order difference frequency intermodulation term designated $f_{IM_3}$, and spectrum sketch 16a shows for convenience only the $f_{IM_3}$ term and the translated $f_1'$ and $f_2'$ terms designated $f_{MT_1}$ and $f_{MT_2}$ wherein subscript MT refers to main tone.

Accordingly $f_{MT_2}$ is changing at twice the rate of $f_{MT_1}$.

Translation frequency converter 20 receives the transmitter 16 RF output signal at its input and also has the local oscillator signal of $(f_{IM_3}+f_{IF_1})$ applied to it from frequency synthesizer 21. Conventional frequency synthesizer 21, used only at the moment for illustrative convenience in the basic explanation of this invention, has its variable frequency output of equal stability as the fixed reference signal of 100 kc., which is supplied from reference crystal oscillator 4. Synthesizer 21 is tuned to generate $(f_{IM_3}+f_{IF_1})$ since $f_{IF_1}$ is predetermined for converter 20 and $f_{IM_3}$ is derived from the difference between transmitter 16 carrier output frequency, $f_{co}$, and the constant IM$_3$ term that develops thereat, and which is equal to $(f_1+f_s)$. Frequency converter 20 output thereby has the $f_{IM_3}$ term located at $f_{IF_1}$ frequency and the translated spectrum becomes the input signal to resolving frequency converter 22. Converter 22 receives a local oscillator signal of $(f_{IF_1}+f_{IF_2})$ from the output of frequency multiplier 23 of times six ($\times 6$) factor. Since $f_{IF_1}$ is predetermined to be at a value of $f_{IF_1}=5f_c$ and $f_{IF_2}$ is predetermined to be at $f_{IF_2}=f_c$, then $$(f_{IF_1}+f_{IF_2})=6f_c$$

Accordingly, the reference $f_c$ input from reference crystal oscillator 4 being applied to frequency multiplier 23 produces $6f_c$ at its output. Hence, resolving frequency converter 22, which possesses a highly selective bandpass filter after its mixer, passes only the constant $f_{IF_1}=f_{IM_3}$ term and rejects all other components in its output. This singular and constant $f_{IM_3}$ term is now translated to the value of $f_{IF_2}$ and applied to the input of detection and vertical amplification stages 24. The resultant output is fed to the vertical plates of CRT indicator 25. The linear sawtooth synchronized voltage provides the X-axis time base of the CRT indicator 25 and a resultant plot of amplitude variation versus frequency location is obtained on the CRT screen.

Hence the output analysis section functions as a narrow band, high selective, frequency stable, wave analyzer, tuned to the RF equivalent of the constant IM (3rd lower odd order) term, its high stabilized selectivity passing only this frequency component in the final I.F. (2nd) resolving strip and effectively attenuating other frequency components that are present in the output spectrum of the ISB transmission system. This analysis constitutes 100% intercept of the IM term which is thereafter visually plotted.

The visual display plotting of this constantly maintained 3rd lower IM term is achieved by the synchronization of the sweep frequency excursion of the audio sweep generator source with the horizontal deflection of the electron beam on a CRT screen of the associated CRT indicator device, having a common linear sawtooth generation stage drive. The modulating element of the audio frequency modulated oscillator source is applied to the horizontal deflection plates of the CRT.

This embodiment as exemplified by the designation of existing general purpose synthesizer given in FIG. 1 can be regarded as an actual implementation of the invented technique. The detailed circuit block arrangements given in FIGS. 2 and 4 constitutes the essential test instrument to formulate a "ISB IM Distortion Test Set" as hereinafter described.

The amplitude of the 3rd lower odd order IM term is plotted, and with a calibrated vertical scale in db, versus a horizontal CRT frequency axis calibration of the virtual center or mean frequency value of the instantaneous location of the two sweeping tones. This virtual center value represents one-half the difference frequency at any time between the tones, that is then added to the lower tone value at that instant or may be expressed as the mean value of $$\left(\frac{f_1 + f_2}{2}\right)$$

The dynamic range of this technique is enhanced and is dependent upon the dynamic range of the selective analyzer and can be greater than 60 db. The final (2nd I.F.) resolving bandwidth does not experience swept frequency energy within its narrow bandpass region, serving mainly to select the constant ever present 3rd odd order I.M. term on a 100% intercept basis, and thereby "ringing distortion" does not develop to give erroneous screen indications.

For a ISB-SSB transmission system not illustrated where a notch rejecting filter is used to further suppress the carrier frequency, a rather low sweep rate need not be used to avoid development of "ringing" distortion due to injection of swept modulated energy into the highly selected attenuation slot. Thus this technique is compatible with both ISB transmission systems since a frequency swept component does not develop at the carrier frequency location.

*Test signal source section*

Figure 2A:
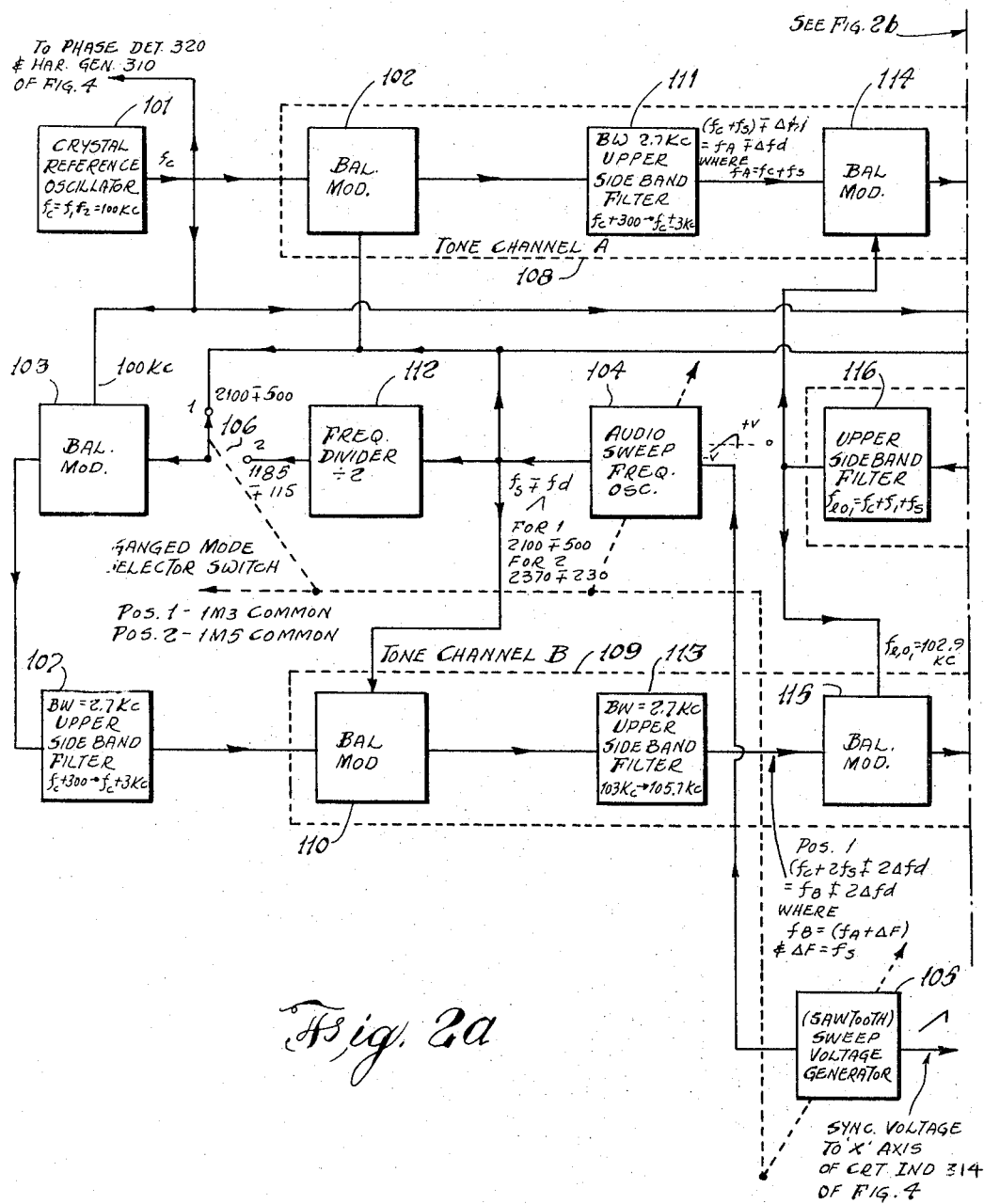

In the illustrated circuit arrangement of FIG. 2, two functional modes of operation are implemented. Herein Mode 1 serves as an alternative method of the test signal generation illustrated and described in FIG. 1. Mode 2 extends the alternative technique to obtaining the response plot of the fifth odd order difference frequency intermodulation product ($IM_5 = 3f_1' - 2f_2'$).

Crystal reference oscillator 101 generates carrier frequency $f_c = f_{1F_2}$ of frequency value 100 kc. This stable frequency signal is applied over five (5) paths. A first path and second path feed $f_c$ as the common reference ($1F_2 = 100$ kc.) input signal to phase detector 320 and harmonic generator 310 of FIG. 4. The function of these signals is covered in the description of FIG. 4. A third path supplies signal $f_c$ as the carrier input to balanced modulator 130 of the section 127. A fourth path and a fifth path apply reference signal $f_c$ as the common carrier input to balanced modulators 102 and 103. The signal inputs to the modulator pair 102 and 103 is derived from the audio sweep frequency oscillator 104 which is modulated by a linear sawtooth voltage supplied by sweep voltage generator 105. Sawtooth generator 105 also supplies the linear sawtooth waveform as synchronization voltage to the X-axis input of CRT indicator 314 of FIG. 4. The sweep frequency signal output of audio sweep frequency oscillator 104 is expressed as $f_{si} = f_s \mp \Delta f_d$, wherein "$\mp$" designates a positive slope direction for the frequency excursion with time. The sweep frequency is fed directly to the input of balanced modulator 102 of tone channel A 108 while another path leads to the input of balanced modulator 110 of tone channel B109. A third path connects $f_{si}$ to contact 1 of mode selector switch 106, and a fourth path directly speeds this signal to the input of frequency divider ($\div 2$) 112. The fifth and final path connects to the carrier input of balanced modulator 123 in the closed loop oscillator CLO Section 127.

Ganged mode selector switch 106 is set in position 1 and the wiper arm of switch 106 connects sweep frequency signal, $f_{si}$, to the input of balanced modulator 103. Modulator 103 output comprises sum and difference frequency products. Upper sideband filter 107 in modulator 103 output passes sum frequency terms only, while readily suppressing the difference frequency products. The sum and difference products are expressed as $f_c \pm (f_{si})$, where in a given example for Mode 1, $f_{si} = 2100 \mp 500$ c.p.s. Hence, USB filter 107 output is of sweep frequency 102.1 kc.$\mp 500$ c.p.s. For Mode 2, selector switch 106 is set into position 2 and the output of frequency divider 112 connects to contact 2. In this case (Mode 2), the sweep frequency signal is changed to $f_{si} = (2370 \mp 230$ c.p.s.). Hence, the sweep center frequency value is switched from 2100 c.p.s. to 2370 c.p.s. and the sweep frequency deviation reduced to ($\mp \Delta f_d = \mp 230$ c.p.s.), while the sweep direction remains unchanged.

The reduced frequency deviation is produced in position 2 by switching sweep voltage generator 105 output to a lesser predetermined voltage excursion about its reference or rest value. The new center frequency value for position 2 is obtained by switching the quiescent or rest frequency of audio swept frequency oscillator 104. Various audio swept frequency oscillator configurations are known in the art; and one that complies with the requirements of high stability and five linearity within the swept frequency range is, by way of preferred example, the phase-shift type of oscillator described in U.S. Patent 2,321,269 issued June 1943.

A further description of this frequency shifted oscillator is given by M. Artyt, "Frequency Modulation of Resistance-Capacitance Oscillator," Proceedings I.R.E. pages 409–414, vol. 32, No. 7, July 1944. Direct sweep modulation of such an R-C phase shift oscillators using control triode tubes, such as of cascade amplifier arrangement, as voltage sensitive variable shunt resistances, are practical for the large excursion of $\pm 500$ c.p.s. or $\pm 24\%$ of the relatively low rest frequency of 2100 c.p.s. Center or rest frequency change is made by a change of the fixed cathode bias voltage for the control tubes, with the input modulating voltage varying the grid bias.

The amplitude of oscillations resulting therefrom are substantially constant as the frequency is varied, and when necessary, a conventional automatic amplitude control system can be used to insure such operation. One such example of a control is given in the book by Terman and Pettit, entitled "Electronic Measurements," published by McGraw-Hill Co., 2nd edition, 1952, p. 488.

Rapid AGC systems, which eliminate amplitude variation but do not limit the rapidity of response of the system, are used. However, a further benefit, in the present case, is noted where a high percentage of center frequency is developed, the 180-degree phase shift ladder network of M. Artyt's referenced frequency modulated oscillator may accomplish its own amplitude limiting within the oscillator tube circuit itself.

Thus at contact 2, $(f_{si}/2 = f_s/2 \mp \Delta f_d/2)$ becomes ($1185 \mp 115$ c.p.s.). Accordingly for Mode 2, USB filter 107 output becomes (107, 185 kc. s.$\mp 115$ c.p.s.) and is fed to the other input of balanced mode 110. USB filter 107 may be of conventional crystal sideband filter type which is of asymmetrical bandpass characteristic readily rejecting the carrier signal and passing unattenuated signals over the frequency region of ($f_c + 300$ c.p.s.) to ($f_c + 3$ kc. s.) for a 2.7 kc. s. BW.

Tone channels A108 (and likewise tone channel B109) comprises an input balanced modulator 102(110), feeding to an upper sideband filter 111(113) in its modulator output, a second balanced modulator 114(115) receiving as its input the output of the USB filter and being supplied by a common local oscillator signal, a low-pass filter 118(117) passing difference frequency products only, and a combination output control of variable gain audio amplifier 120(119) and output attenuator 124(123).

Sum and difference frequency products develop in modulator 102 and modulator 110 output. Considering first tone channel A108, then upper sideband filter 111, which is like unto USB filter 107, passes the sum frequency terms only, expressed as $(f_c+f_s) \mp \Delta f_d = f_A \mp \Delta f_d$ where $$f_A = (f_c+f_s)$$

In the given example, Mode 1 results in a USB filter 111 output of 102.1 kc.$\mp$500 c.p.s., while Mode 2 gives the output of 102.37 kc.$\mp$230 c.p.s.

Returning now to tone channel B109, it is to be noted that like direction sweep frequency excursions are being applied to the inputs of balanced modulator 110 and thereby the sum frequency product results in the additive combining of the input signals to thereby effect the doubling of the sweep excursion without harmonic generation.

For Mode 1, the sum product output of upper sideband filter 113 becomes:

$$(f_c+f_s \mp \Delta f_d)+(f_s \mp \Delta f_d)=(f_c+2f_s) \mp 2\Delta f_d = f_B \mp 2\Delta f_d$$

where $f_B=(f_A+\Delta F)$ and $\Delta F=f_s$. Numerically expressed in the given example, therefore pos. 1

(102.1 kc.$\mp$500 c.p.s.)+(2100
    $\mp$500 c.p.s.)=104.2 kc.$\mp$1000 c.p.s.

For pos. 2, $$\left(f_c+\frac{f_s}{2} \mp \frac{\Delta f_d}{2}\right)+(f_s \mp \Delta f_d)=\left(f_c+\frac{3f_s}{2} \mp \frac{3}{2}\Delta f_d\right)$$

which numerically gives the following:

(101.185 kc.$\mp$115 c.p.s.)+(2370
    $\mp$230 c.p.s.)=103.555 kc.$\mp$345 c.p.s.

USB filter 113 may also be of 2.7 kc. s. BW, but here its range of passed frequencies covers the region of 103 kc. to 105.7 kc. The outputs of USB filters 111 and 113 become the signal inputs to balanced modulators 114 and 115 respectively. The carrier input of balanced modulators 114 and 115 is the common local oscillator signal $f_{lo}$, of frequency value 102.9 kc. s. supplied from the output of upper sideband filter 116 of CLO section 127. The 102.9 kc. $f_{lo}$ signal is predetermined to be $(f_c+f_1+f_s)$, and is generated and supplied momentarily in the following way. Stable audio reference oscillator 125 generates signal $f_{IM3}=2900$ c.p.s. which may further serve as a reference signal input to the ISB transmission system under test. The signal output of frequency 2900 c.p.s. is also fed to one contact of momentary switch MS126, which is normally open as shown. The other contact of MS126 connects to the signal input of balanced modulator 130. Modulator 130 output feeds to USB filter 116 which selects only the sum product term of $(f_c+f_1+f_s)$, where $f_s=2100$ c.p.s. for Mode 1 and $f_1=800$ c.p.s. Then $(f_1+f_s)=2900$ c.p.s. and for $f_c=100$ kc., the USB filter 116 output becomes $f_{lo}=102.9$ kc. upon the momentary closing of MS126. USB filter 116 may be like unto USB filter 107, or be of selective bandpass filter type of center frequency value $f_{cF}=102.9$ kc. The continuous closed loop generation of this common local oscillator signal is described later on.

The difference frequency product outputs of balanced modulators 114 and 115 are applied and passed unattenuated by low-pass filters 118 and 117 respectively.

For position 1, Mode 1 operation, low-pass filter 118 output becomes $(f_c+f_1+f_s)-(f_c+f_s \mp \Delta f_d)=f_1 \pm \Delta f_d=f_1$ instantaneous.

Figure 3A:
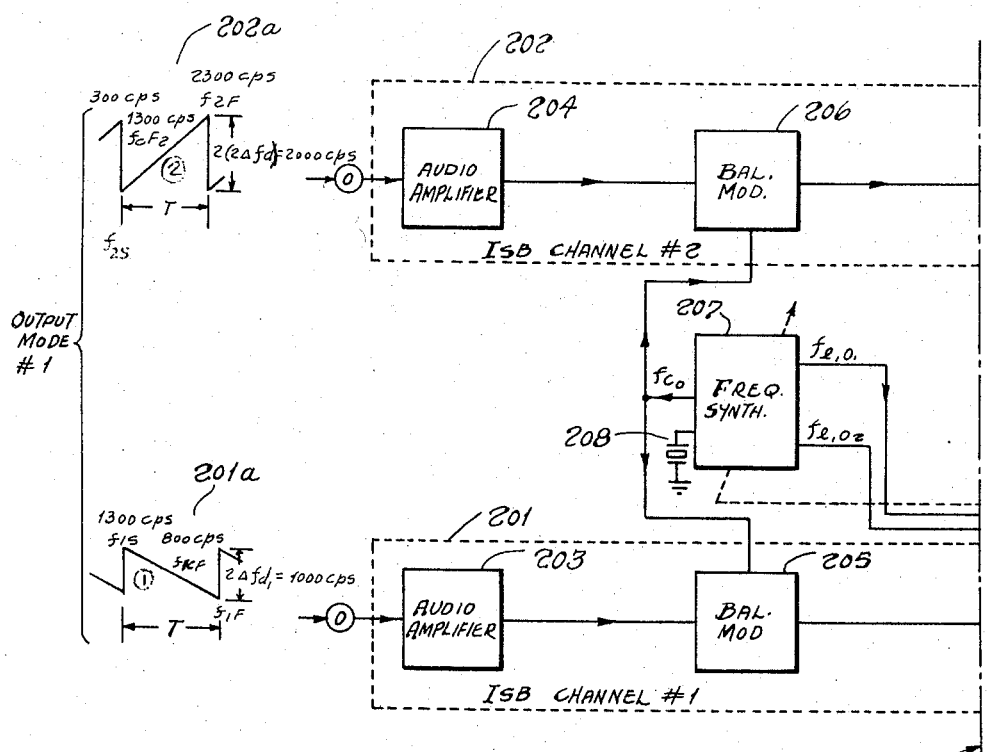
FIGS. 3a and 3b are a block diagram of a typical Independent Sideband (ISB) Transmission System.
Figure 3B:
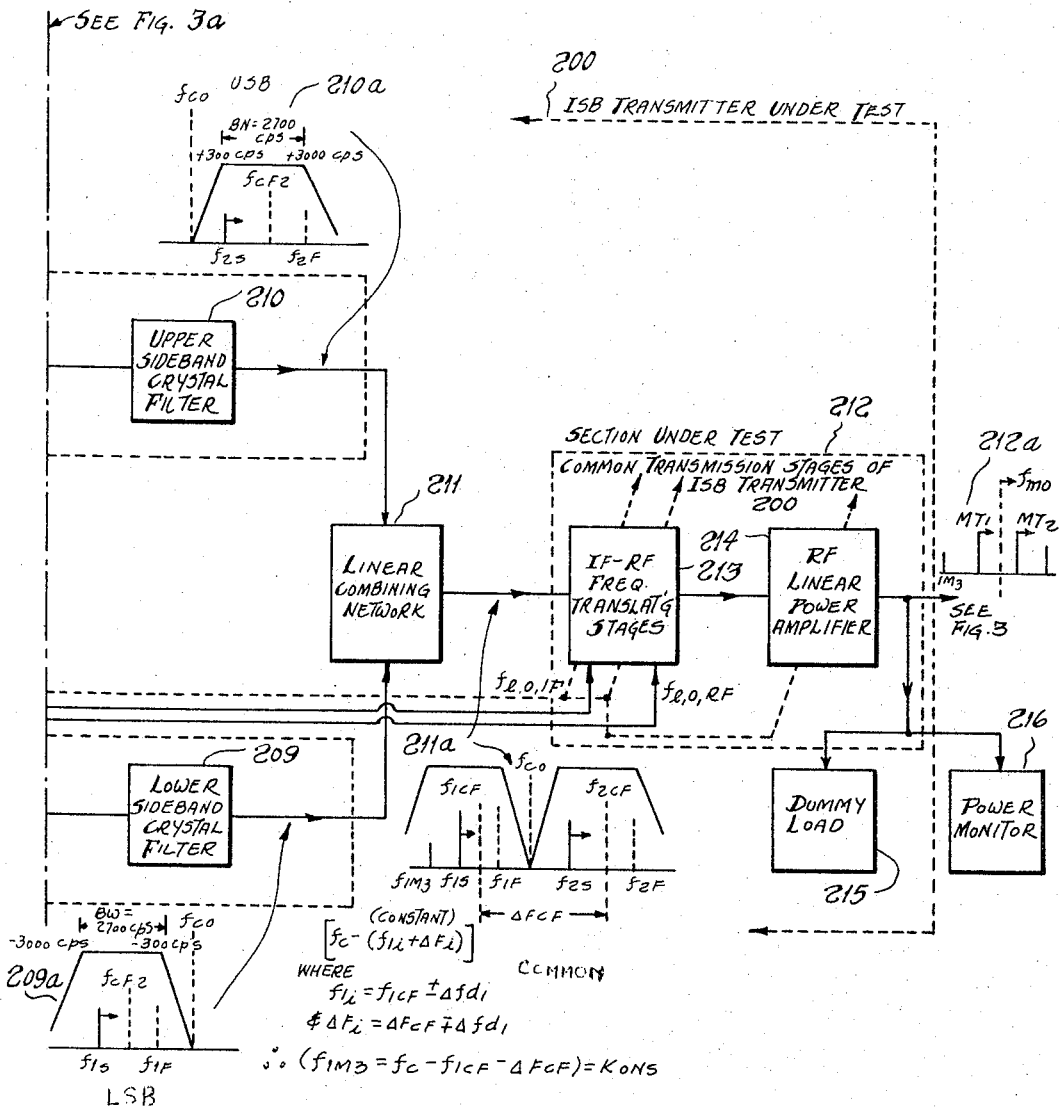

Numerically, this frequency excursion represents the sweep signal input for ISB channel I of FIG. 3 and becomes 102.9−(102.1 kc.$\mp$500)=800$\pm$500 c.p.s. as shown in sketch 201a of FIG. 3. For position 2, Mode 2, then 102.9 kc.−(102.37 kc.$\mp$230)=530$\pm$230 c.p.s.

For low-pass filter 117 output, position 1 gives $$(f_c+2f_s \mp 2\Delta f_d)-(f_c+f_1+f_s)=f_2 \mp 2\Delta f_d=f_{21}$$

where $f_2=(f_s-f_1)$.

Numerically, this frequency excursion becomes the sweep signal input for ISB channel II of FIG. 3 and is as follows:

104.2 kc.$\mp$1000 c.p.s.−102.9 kc.=1300$\mp$1000 c.p.s.

as shown in sketch 202a of FIG. 3. For position 2, 103.555 kc.$\mp$345 c.p.s.−102.9 kc.=655$\mp$345 c.p.s.

The output of low-pass filter 118 is applied over two paths, one path being to input of variable gain audio amplifier 120 and the second path feeding to the other input of balanced modulator 128 of the CLO Section 127. Low pass filter 117 output is supplied to variable gain audio amplifier 119.

Amplifier 120 output is fed over two paths, one path connecting to contact A of single pole double throw switch 121 and the other path feeding to channel A attenuator 124. Amplifier 119 output connects to contact B of switch 121 and also feeds to channel B attenuator 123. Tone meter 122, fed from wiper of switch 121, serves to provide for equal tone channel output amplitude adjustment. The tone channel outputs A and B are respectively supplied to ISB channels I and II of FIG. 3.

It now remains to describe the continuing generation of the controlled local oscillator signal as accomplished by CLO section 127, which comprises balanced modulators 128 and 130, bandpass filter 129, and upper sideband filter 116. As described previously, negative-slope sweeping tone signal output $(f_1+\Delta f_d)$ is applied to one input of balanced modulator 128 and positive slope; audio sweep frequency signal $(f_s \pm \Delta f_d)$ is being fed to the other modulator 128 input. The modulator 128 output comprises sum and difference frequency products of $(f_{s1}-f_{11})$ and $(f_{s1}+f_{11})$ or $$[(f_s \mp \Delta f_d)-(f_1 \pm \Delta f_d)]=f_s-f_1 \mp 2\Delta f_d$$

and $$[(f_s \mp \Delta f_d)+(f_1 \pm \Delta f_d)]=f_s+f_1$$

Band-pass filter 129 is of high selectivity and has its bandpass set at $f_{cF}=2900$ c.p.s. Now $(f_{11}+f_{s1})$ for position 1 is (2100+800)=2900 c.p.s. while in position 2 (2370+530)=2900 c.p.s. BPF 129 readily passes signal $(f_1+f_s)$ to the signal input of balanced modulator 130, and rejects all other frequency components. This continuous signal of $(f_1+f_s)=f_{IM3}=2900$ c.p.s. replaces the momentary signal that was initially supplied by the closing of momentary switch 126. Observe then that only crystal reference oscillator 101 and audio sweep frequency oscillator 104 remain as the direct signal generating sources in the unique signal producing and processing circuits arrangement of FIG. 2. Note further that the above designated oscillators are commonly supplied to each tone channel in the development of the sweeping tone test signal outputs of interest. This disclosed signal generation operation serves to negate any frequency error discrepancy due to frequency instabilities such as would result from the use of more than one crystal oscillator, where existing differing frequency drift amounts and direction are known to introduce undesirable effects in the area of narrow band, highly selective measurements. Whereas the stage of FIG. 1 represent one embodiment, and the generation principles are further shown by the block diagram example of FIG. 2, it is clear that the scope and applications of this nature of signal generation is of broad range and may be readily extended in an evident manner in accordance with the teachings of the given examples.

While it is recognized that the momentary use of an audio frequency reference signal serves to actuate the self-sustaining signal generating process shown in either FIG. 1 or FIG. 2, continued usage of such audio reference oscillation in the modulation process performs no more novel function than the earlier described undesirable use of two separate reference oscillators. It is by the uniquely derived self-sustaining action disclosed herein which replaces the audio reference oscillation that the featured operation by way of but one reference oscillator is then attained with the desired performance resulting therefrom.

In the practical ISB transmission system, the audio amplifier stages are likely to be somewhat identical though not necessarily possessing flat uniform characteristics of gain throughout their BW, the sweep audio frequency excursion through the ISB channels are taken over those portions of the amplitude-frequency response characteristics that are flat and uniform but perhaps not of equal gain. A static two tone test position, i.e., sweep made inoperative, allows for the adjustment of the tones to secure the equal amplitude relationship upon being combined.

The variable output attenuators 123 and 124 may be used to obtain the equal amplitude relationship between the applied sweeps signals that combine at the channel outputs of the ISB transmitter under test to accordingly account for any deficiencies between the two ISB modulating channels as determined by a static two tone measurement on the CRT screen.

*Input-output for system under test*

Refer now to FIG. 3, which presents a functional block diagram of a typical ISB-SSB type transmission system under test 200, and illustrates the development of the constant IM term of interest in the common IF-RF section under test 212. Recall from FIG. 2, that the two separate audio swept signals, their frequency excursion shown sketched as 201a for $f_1$ and 201b for $f_2$, and the subsequent time base for the CRT horizontal beam deflection are derived from the common sweep voltage generator 105 of FIG. 2 such that the sweep period "T" is identical for all three paths that the sweep output follows. The operational description given by FIG. 3 will only concern the function for Mode 1 operation and the measurement of the 3rd lower IM terms being of interest. From following description, it becomes apparent that the 5th IM term development functions in a similar operational manner.

It is understood that the automatic gain control (AGC) operations and the like of the ISB transmission system 200 must be disabled to make the system variant.

In sketch 201a, for $f_1$, the sweep covers 1300 c.p.s. to 300 c.p.s., while sketch 202a shows $f_2$ has an excursion of from 300 c.p.s. to 2300 c.p.s., thus being of opposite direction as that of $f_1$.

Audio sweep signal $f_1$ is applied to ISB channel I201 input and, upon passing through audio amplifier 203, becomes the modulating signal input to balanced modulator 205. Audio sweep signal $f_2$ is simultaneously being applied to the input of ISB channel II202, and, after amplification by audio amplifier 204, is applied to the input of balanced modulator 206. Amplifiers 203 and 204 are like unto each other, as are the balanced modulators 205 and 206. The balanced modulators 205 and 206 have a stable common carrier frequency input designated $f_{co}$, which may be any I.F. value and in the given example is 100 kc., that is generated and supplied by frequency synthesizer 207. Frequency synthesizer 207 is conventional with its frequency output being derived from a single crystal $f$ standard 208.

Synthesizer 207 also usually serves to supply the local oscillator tuning signals for the IF-RF stages of the transmitter, which for a double heterodyning arrangement are shown designated as $f_{lo1}$ and $f_{lo2}$.

For ISB channel I, balanced modulator 205 feeds its output to lower sideband crystal filter 209, that selects the inverted difference frequency product and readily suppresses the carrier signal and sum frequency components, to produce the inverted spectrum output in the manner as shown sketched 209a.

It is typical for the ISB transmitter to have a bandwidth of say 2700 c.p.s. whereby the voice frequency region passes from say 300 to 3000 c.p.s. for example.

For ISB channel II, the output of balanced modulator 206 is applied to upper sideband crystal filter 210 which passes only the sum frequency components and heavily attenuates the carrier, lower sideband terms. The upper sideband filter 210 output spectrum is representatively shown by sketch 210a.

The crystal sideband filter outputs, that is inverted sweeping tone signal $f_1'$ of LSB filter 209 and non-inverted sweeping tone signal $f_2'$ of USB filter 210 are fed to separate inputs of linear combining network 211. The combined tone pair at the output of the linear combiner 211 thereby constitutes the usable test signal input as shown by sketch 211a to the common remaining stages of ISB transmission system 200. In the course of the sweep frequency test signal excursion through the channel bandpass region of section under test 212, the lower 3rd odd order IM term of $f_{IM3}$ develops at the following fixed frequency location of $f_{IM3}=f_{co}-(f_{1i}+\Delta F_i)$ where $$\Delta F_i = \Delta F_{cf} \mp \Delta f_{d1}$$
$$f_{IM_3} = f_{co} - f_{1cf} \mp \Delta f_{d1} - \Delta F_{cf} \pm \Delta f_{d1}$$
$$= f_{co} - f_{1cf} - \Delta F_{cf} = \text{constant}$$

For $f_{co}=100$ kc., $f_{1cf}=800$; $\Delta f_{cf}=2100$
Then $f_{IM_3}=100$ kc.$-2900$ c.p.s.$=97.1$ kc.

Accordingly, the IF-RF frequency translation stages 213 convert the combined sweeping test signal to the high frequency region of 2–32 mc. The linear RF power output amplifier 214 develops the rated power output into the transmission systems dummy load 215, which substitutes for the antenna during the test measurement.

The power output monitor 216 of the transmission system provides data on the rated PEP (peak envelope power) obtained in the following way. By suitable switch means at the test signal source output, one sweeping tone may be removed from the test signal input. Power monitor 216 then measures the mean power output due to the remaining single tone input signal. Rated PEP thereby equals four times power output in watts due to single tone.

Accordingly thereafter the power output may be monitored and the third order $f_{IM_3}$ distortion product be measured for each scan cycle as the audio input level is changed by discrete intervals. In this manner a relationship between power output and distortion may be obtained.

In such cases where the two third order products and the two fifth order products may have different amplitudes, a separate response measurement curve for each term may be made in accordance with the disclosed technique of this invention. For upper odd order IM distortion term measurement, sweep signal $f_{1i}$ is applied to the upper sideband ISB channel II while $f_{2i}$ feeds to LSB-ISB channel I to thereby reverse the sweep direction of the combined test signal.

To secure the maximum deviation, the sweep audio frequency test signal $f_{2i}$ is set to start at the lowest frequency value of the upper sideband channel, that is, in a typical I SB=SSB system at $f_{2s}=300$ c.p.s. It is now accordingly desirous to effect location of the 3rd odd order IM term within the flat portion of the ISB channel, in the illustrated case the lower main IM term; with the lower sideband channel being of 300 c.p.s. to 3000 c.p.s. below the virtual carrier frequency value. The lowest acceptable frequency value would be at 3000 c.p.s. below the carrier, however let 2900 c.p.s. be set for the example case. This effectively allows for the sweep width excursion of 1000 c.p.s. and the start frequency value of the swept audio frequency signal ($f_1$) becomes 1300 c.p.s. in the lower sideband channel. Since the sweep direction of signal ($f_1$) is of opposite direction, that is negative going from a high frequency to lower frequency, then the 1000 c.p.s. excursion terminates at $f_{1t}=300$ c.p.s., which represent the lower frequency limit of the bandwith of the lower sideband filter (LSB). In accordance with the harmonic ratio of two to one between the sweeping audio test signal inputs, the sweep width of sweeping signal ($f_2$) becomes 2000 c.p.s. thus terminating the frequency excursion of the tone at $f_{2t}=2300$ c.p.s. within the flat bandpass region of the upper sideband filter (USB).

In the linear combining that follows, sweep ($f_1$) tone becomes the lower main tone and sweep signal ($f_2$) becomes the higher main tone. Whereas the excursion of the two sweeping signals occur within the same time interval or that is, of equal sweep rates and the variations are linear with time, then the two sweep excursions are expressed as follows: audio sweep signal $f_1$ of $\mp \Delta f_d = 500$ c.p.s. where $f_{cf1}=800$ c.p.s. and audio sweep signal $f_2$ of $\pm \Delta f_d = 1000$ c.p.s. where $f_{cf2}=1300$ c.p.s.

It can now be understood that wherein the conventional designation of the particular main lower IM term normally expressed as ($2f_1-f_2$) in this uniquely derived technique formulates itself as $[(-2f_1-f_2)$ or $(2f_1+f_2)]$ when referenced about the virtual carrier frequency value. These relationships are further maintained throughout the upward frequency tanslation of the transmission system due to the high stability of cystal oscillators or frequency synthesizers normally used. Hence at the HF output as sketched 212a of the transmitter, the main IM term locates itself at a RF frequency value, that is constantly maintained, as in the illustrated example, 2900 c.p.s. below the transmitter output carrier frequency that is tuned. Thus at the carrier channel frequency in the region of 2–32 mc.; say operating frequency $f_0=10$ mc., then $f_{IM}$ lower 3rd is at $(f_0-f_{IM_3})$ below or (10 mc.−2900 c.p.s.=9.9971 mc.).

At sweep signal start, the closest signal frequency value to this IM component location occurs at $f_{1s}=1300$ c.p.s. giving for the HF output 10 mc.−1300 c.p.s.=9.9987 mc. The frequency separation at this point is 2900−1300= 1600 c.p.s. (or 9.9987−9.9971=0.0016 mc.), and becomes increasingly greater in a linear manner as the sweep cycle proceeds with its frequency excursion.

Figure 4B:
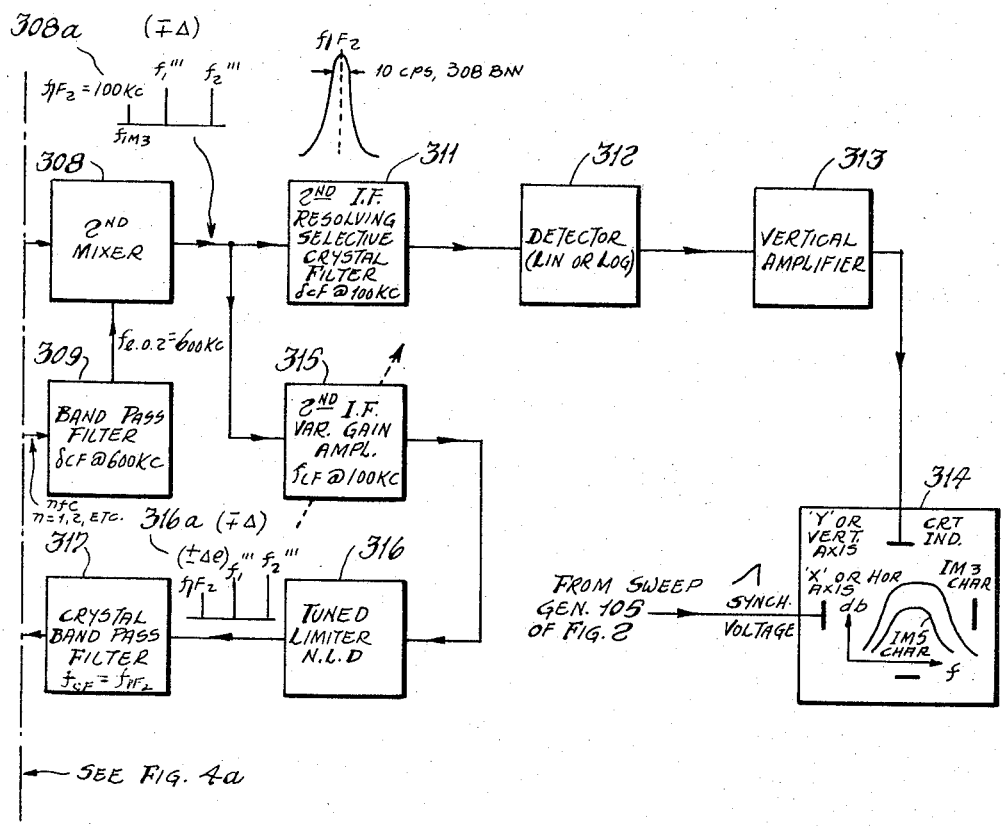

This 1600 c.p.s. minimum frequency separation amount affords adequate spacing between adjacent signals to readily achieve the tracking of this fixed IM frequency component by the most selective narrow band analyzer of FIG. 4. In the illustrated example of FIG. 1, the conventional frequency synthesizer tuned analyzer served well to provide this function. The high stability of such an analyzer's tunable local oscillator for spectrum translation, the wide linear dynamic range, the selectable variation of its resolving bandwidth, its log detection capability and finally its integrated CRT(5″) indicator are likewise obtained in FIG. 4 embodiment without the frequency synthesizer. Here a novel AFC operation replaces the complex synthesizer without loss of performance.

*Output analysis section—FIG. 4*

Refer now to FIG. 4 which illustrates an embodiment of the output analysis section of the disclosed test set that performs the signal processing of the high frequency test response output of the transmission system under test 200. FIG. 4 further features the unique circuits arrangement that provides for the automatic frequency control (AFC) and stabilization of the variable frequency oscillator (VFO) that replaces the previous conveniently used example frequency synthesizer of FIG. 1 in accordance with one of the stated objectives of this invention.

As shown by spectrum sketch 301a, the test response output to be analyzed is applied to input attenuator 301, which allows for the proper voltage level input to 1st mixer 302. Variable frequency oscillator 303 supplies the proper local oscillator signal of frequency value $$f_{lo1}=(f_{RFIM_3}+f_{IF})$$

to the other input of 1st mixer 302.

ISB–SSB transmission systems are known to be precise and stable in frequency and the stable nature of the test signal source of FIG. 2 has already been described. Hence the appropriate frequency location of the constant IM term of interest is to be readily determined from the calibrated tuning settings of the test signal source along with the ISB transmission tuning indicator.

It is to be understood that the operation of the output analysis section of FIG. 4 for measurement of the 3rd odd order term is similar to that required for 5th odd term measurement and the given description will mainly deal with the 3rd or $f_{IM_3}$ term. The tuning control and dial indication of variable frequency oscillator 303, as mechanically ganged, may cover, with a suitable bandswitching arrangement, the range of the HF–ISB transmission system 200 of 2–32 mc. plus being at 500 kc. s. above such value of the specific constant frequency value IM term of interest, say $f_{IM_3}$. Thereupon by way of an automatic frequency control (AFC) operation to be later described, the tuning operation is accomplished, thus exactly frequency translate the $f_{IM_3}$ term to the $f_{IF_1}=500$ kc. s. location at which it is thereafter stabilized.

VFO 303 output level may be adjusted and set to proper signal amplitude to the mixer 302 as monitored by calibrated indication on RF level meter 303a to thereby provide the desired linear dynamic range relationship between mixer 302 input and output.

With the hetrodyning of these two signals in mixer 302, the sum and difference frequency products along with the input and local oscillator signal appear in the mixer output, and are applied to low pass filter 305. LP filter 305, having its cutoff frequncy set greater than the maximum difference frequency value, say at 600 kc. s. acts to readily suppress the higher frequencies and any other undesired spurious signals that may exist in the mixer 302 output. The passed difference frequency signal becomes the input to 1st IF amplifier 306, which has its center frequency value at 500 kc. s. and possesses a flat uniform bandpass region having a bandwidth of say 30 kc. s. The 1st IF amplifier 306 output as shown by sketch 306a, after passing through IF attenuator 307, becomes the input signal to the 2nd mixer 308 of the double heterodyne arrangement.

The other input of 2nd mixer 308 is of stable local oscillator frequency value $f_{lo2}=600$ kc. s. supplied from the output of bandpass filter 309. Hence the specific constant frequency term in the difference frequency output of the second conversion process becomes $(f_{lo2}-f_{IF_1})=f_{lo2}-$ translated $f_{IM_3}=(600$ kc. s.$-500$ kc. s.$)=100$ kc. s. This constant frequency $f_{IF_2}$ signal of 100 kc. s. is selectively bandpassed by the 2nd IF resolving selective crystal filter stages 311 being at center frequency $f_{cF}=100$ kc. s. in the 2nd mixer 308 outputs. A second mixer 308 output path feeds to 2nd IF amplifier 315 and this signal path will be described in the later paragraphs on the AFC operation. This filter 311 output is thereafter applied to linear or log detector 312. The resultant varying DC output of detector 312 is then amplified by vertical deflection amplifier 313 to be thereupon applied to the vertical plates of CRT indicator 314. With frequency axis calibration by way of the synchronization voltage supplied from sweep generator 105 of FIG. 2, the visual traceout represents the frequency response characteristics of the IM term of interest within the common channel bandpass region of the ISB transmission system being tested.

At this point, it is evident that the passage of the sweeping test signals ($f_1$ and $f_2$) through the separate ISB balanced modulators channels of the transmission system represent single tone variations.

The formulation of the two tone combination in a sweeping relationship at the linear mixing stage output constitutes a low residual distortion test signal. Hence the expected fairly small main IM term response of the following transmission system stages to this test signal at some locations in the course of the sweep cycle requires the establishment of at least a continuous 60 db (or more) calibration range on the vertical scale of the analyzer's CRT.

In practice, this requirement may be met in bypassing the scale expanding IF attenuator 307 of the analyzer.

The tracking and effective 100% interception of the translated fixed IM term is made by the analyzer section's IF resolving strip 311, which usually consists of three or more cascaded stages of highly selective crystal filter circuits. Use of three stages readily secures the 60 db log dynamic range of response. With the IM term of interest translated downward to be at all times in coincidence with the center frequency value of the narrow resolving $IF_2$ bandpass region usually set at 100 kc. s., the other varying frequency components of the transmitter output are fully attenuated at this location in the analyzer signal path.

The bandwidth setting of the resolving $IF_2$ is dependent upon the initial frequency separation of the sweep test tones, that is $(f_2-f_1)$, which for desirable operation becomes the band base selectivity criteria at greater than 60 db.

This is more than adequately attained by the fixing of the static resolving $IF_2$ bandwidth at 3 db setting of 10 c.p.s. or less. The following log detection and vertical deflection amplification processes of the analyzer section are conventional and well known. Thus, with the ready availability of the output analyzer, direct IM plotting is developed either on the CRT screen, or using the X–Y input of a graphical recorder by plotting the video output with synch "X" driving voltage.

In the case of repeated scan display on the CRT screen, use may be made of conventional CRT beam trace blanking techniques in the course of the sweep flyback time.

The output analyzer unit is made to achieve the 100% intercept probability of the constant (now a HF value) frequency main IM tone of interest by tuning the variable frequency, an AFC controlled oscillator, of the analyzer to accept at the center of its input passband the frequency component of interest, which in the illustrated example, locates itself 2900 c.p.s. below the transmitter virtual carrier frequency output value.

In essence, this ISB distortion measurement technique represents, at the transmission output at any one instant of time during the excursion cycle a two tone RF signal of variable frequency separation with time; the frequency separation being fixed, then frequency location of the lower 3rd odd order IM term of constant (RF) frequency value.

In the like typical system of FIG. 3 there may be a ISB–SSB transmitter where double conversion occurs after the linear combining and the output amplifier stages are tuned to the difference frequency mixer output after each conversion. For this situation a frequency inversion occurs at the first frequency translation since the local oscillator frequency being used is below the input signal frequency. An odd order IM term still develops, or if of prior existence is accordingly similarly translated.

For this case of signal processing where inversion results, the sweep excursion occurring at twice the width becomes the lower frequency tone, where the upper frequency tone is of one half the sweep width. The direction of the changing frequency of the sweep excursion is reversed, but both are proceeding in a like scan direction. Actually the constant main IM relationship now becomes $(2f_2-f_1)$ wherein the 3rd upper odd order term is being developed to occur at the same frequency location that the prior constant frequency location IM term exists, or if none has developed, at the location which is being monitored at the transmitter output. Thus, irrespective of the translation process that is in effect, the main IM term distortion is continuously being accumulated thru the system and is the specific IM term that is to be tracked by the analyzer section of FIG. 4. To accommodate direction reversals, the variable frequency oscillator 303 may be set at 500 kc. s. below IM terms of interest.

In rapid testing, it is not always necessary to measure or determine the distortion level of all the odd IM terms developed. It is only required that it be indicated that particular level is at least below a specified limit. Hence if the 3rd (main) IM term meets the specified level, then the probability is great that the other terms, 5th, 7th, etc. are at least below this value, and this indication may serve as signal to distortion ratio plotting.

For the integrated test set, the dynamic range for plotting purposes would include a 60 db calibrated screen rather than on the vertical scale breakup of 40 db—20, used by spectrum analyzers for individual "pip" response displays. Calibration of the zero db reference line is obtained by having the amplitude of one tone of the main two tones set to deflect to the zero db line. This is to be a static calibration, that is, all sweeping frequencies made stationary by disconnecting the sweep voltage source.

*AFC operation*

It is to be noted from the recent results of prior art static two tone intermodulation measurements that at particular levels of test signal voltage drive, the intermodulation components of $IM_3$ and $IM_5$ at times apparently vanish. (See reference technical publication in IRE Transactions on Communications Systems, "Linearity and Intermodulation in High Power Tuned Amplifiers," R. C. Cumming, June 1962, pp. 219–220.)

Further novel use is herein made of this newly revealed fact to undertake and insure the unique AFC operation of variable frequency oscillator 303.

Also it is long known that in the CCIF method of measuring intermodulation distortion two frequencies of equal amplitude are applied to a system and the lowest frequency difference, 2nd order product is extracted with a low pass filter. One recognized drawback of the CCIF method is its failure to determine odd order distortion, which usually is the principal distortion in push-pull systems. Herein this observation may be put to advantageous use by the application of the feedback test signal response of interest to a pull-pull device in the course of accomplishing an AFC operation.

It is to be additionally noted that a further difficulty experienced in practice by the use of the complex frequency synthesizer of FIG. 1 is the fact that while the synthesizer may be set to the exact local oscillator frequency value desired and thereafter so remain, the stability of the test signal being used itself may well result in a changing of the resultant translation to about a new IF frequency value other than the predetermined IF. As such, the further goal of the present invention is to provide a controlled local oscillator signal frequency that secures and maintains the translation to about the predetermined frequency $f_{IF}$, and fairly independent of test signal stability. Thus, equally relied upon in this novel AFC operation is the further realization one may now make that although the associated main tones and intermodulation product terms are continuously varying their frequency with time, the principle IM term being developed is of constant and invariant frequency location in the course of the sweep cycle. Since the sweeping signals are derived from a common sweep source and the sweep rate is doubled for one of the pair of swept signals in an additive manner, any frequency drift in the common source does not affect the quiescent frequency location of the constant IM term of interest since the two to one sweep ratio remains in effect. Subsequently any frequency discrepancy from its specified location after frequency translation is directly traceable to the frequency error that occurs only in the translation operation of the output analysis section of FIG. 4. Accordingly, the frequency error is herein further localized to be resultant from solely the first translation operation of the double conversion process of FIG. 4 by generating the 2nd local oscillator signal of $f_{lo2}$ from the 100 kc. s. signal output of the single crystal reference oscillator 101 of FIG. 2 where oscillator 101 is common to the generation of each tone signal. This reference and stable signal frequency, which functions as the reference in the AFC operation, is also supplied to input of harmonic generator 310, which produces a sawtooth type RF waveform at its output. Such a wave contains all the harmonics of the input frequency. Upon being applied to bandpass filter 309, of narrow bandwidth about a center frequency value of 600 kc. s. only the sixth harmonic term is selected, while all other harmonic terms are readily rejected, and becomes the local oscillator signal to the 2nd mixer 308 as mentioned earlier. The local oscillator signal is of proper signal level at the mixer 308 to provide a proportional linear relationship between the mixer input and output for over the dynamic range of interest.

In FIG. 4 now consider the second path output of 2nd mixer 308 that feeds to 2nd IF variable gain amplifier 315, which is of center frequency value of $f_{IF_2}=100$ kc. s. and is of sufficient bandwidth to encompass the maximum frequency deviation of the sweeping test response signals under analysis shown sketched at 308a, which may be say a 10 kc. s. bandwidth. As pointed out earlier, the presence of the $f_{IM_3}$ term may not be considered reliable, and the 2nd IF variable gain amplifier 315 is set to supply sufficient signal output which is accordingly fed to a non-linear device (I.V.L.D.) such as tuned limiter 316. Such non-linear operation here insures development of intermodulation and the obtaining of the constant frequency signal of $f_{IM_3}=f_{IF_2}$ at 100 kc. s. at its output, as shown by spectrum sketch 316a, with plus or minus the accompanying frequency translation error of $(\pm)\Delta e$ that is to be removed.

The non-linear device 316 output is then fed thru a flat topped crystal bandpass filter structure 317, herein comprising a lattice cascade arrangement with sharp skirt selectivity. The bandpass region of the crystal filter encompasses say a 500 c.p.s. bandwidth about the center frequency value of $f_{IF_2}=100$ kc. s. It is to be noted that the AFC operation being described may be effected say by static test signal generation which may at times be desirable of very high tuning frequencies.

A two terminal device having a voltage current relationship which is expressable as a power series of $$i = A_0 + A_1 e A_2 e^2 + A_3 e^3$$

is a usable non-linear device, and such an element is a square-law detector. Where the power series is of the odd function type of say $e_0 = A_1 e_1 + A_3 e_1^3 + A_5 e_1^5 + \ldots$ this represents the input-output transfer characteristic of a limiter or clipper stage 316. Accordingly there occurs splatter (intermodulation) frequency components of the odd order in the output, of which the lower third term is static.

Crystal BPF 317 output is supplied to the input of limiter 318 and consists of the translated $f_{IF_2}$ with frequency error, or 100 kc. $(\pm)\Delta e$. In the course of initial tuning, wherein the swept energy signals are brought into the bandpass region of filter 317, the rate of their frequency excursion usually exceeds the follow-up capability of the feedback arrangement and are not slow enough to remain within the lock-in bandwidth range of the control loop.

The $f_{IF_2}$ error signal output from limiter 318 of [100 kc. $(\pm)\Delta e$] is fed over two paths, one path to the input to frequency discriminator 319, and over a second path, to one input of phase detector 320, whereby frequency and phase comparisons are respectively made. As described earlier, phase detector 320 receives its other reference input of $f_c = f_{IF_2}$ ref.=100 kc. s. from crystal reference oscillator 101 of FIG. 2. Discriminator 319 has its reference center frequency value pre-determined to be at $f_{cF} = f_{IF_2} = 100$ kc. s.

Discriminator 319 and detector 320, like conventional comparators, are subject to amplitude variation errors of the input signal and limiters, such as limiter 318, are normally used in the signal paths prior to the comparator inputs. The parallel arrangement of discriminator 319 and detector 320 operates concurrently in a combined manner, whereby automatic control due to discriminator 319 is of a coarse nature in having a large capture range to bring about the closing of the frequency difference in the loop to within the narrow capture range of the phase detector 320. Combination frequency-phase comparators and their operation are known in the art, a suitable example of which is referenced in McGraw-Hill 1964 publication "SSB Principles and Circuits" by E. Pappenfus, etc. Fig. 8-21, p. 137. The overall effect of such combination signal comparison is that unless the applied error input signal of $f_{IF_2}$ and the reference IF$_2$ signal are of equal frequency value of 100 kc. s. and in phase lock, a polarized D.C. correction signal is supplied through loop low pass filter 321, to control the frequency of operation of variable frequency oscillator 303 in the conventional manner until the phase locking of the two signals is accomplished.

Loop low-pass filter 321 serves to stabilize the gain characteristic of the closed frequency control loop, and applies its output of D.C. voltage proportional to $(\pm)\Delta e$, to the voltage controlled variable reactance 304 of variable frequency oscillator 303. Conventional AFC tuning indication (not shown) may be supplied to monitor the D.C. correction voltage output from filter 321.

Voltage controlled variable reactance 304, which may be a voltage sensitive variable capacitance diode in its association with the tunable inductance-capacitance network of variable frequency oscillator 303, determines the output frequency of this oscillator. Within the closed loop arrangement, voltage controlled reactance 304 varies in response to the D.C. correction voltage being supplied by the comparators 319 and 320 to accordingly coact with the frequency determining circuitry of variable frequency oscillator 303 in the conventional manner. Thereby VFO 303 changes its frequency such that the translated test signal response spectrum locates itself in the first I.F. bandpass region with the constant $f_{IM_3}$ component appearing exactly at the $f_{IF_1}=500$ kc. s. value and thereafter stabilized at the position. Thereupon the exact second conversion operation translates this stable $f_{IM_3}$ component at $f_{IF_1}$ to within the exceedingly narrow pass slot of the IF$_2$ selective filter 311. Normally proper AFC operation is insured since only one static frequency component is present by which the error signal can be obtained. Hence, upon stabilization the frequency response plotting is immediately effected.

While a linear sawtooth modulating waveform has been used throughout the technique example description presented herein, a tri-angular waveform may also be used. Here a switchover of sweep direction that accompanies the triangular excursion allows for negation of amplitude variations.

So far the entire operational description of this approach has in its Mode 1, centered upon the tracking of the 3rd IM distortion term. This is a preferred rapid test operation, most significant to the in-the-field evaluation of ISB–SSB transmission systems by relatively unskilled test personnel. However, where more elaborate tests are required, this ISB–IM distortion measurement technique is also directed to likewise include the next most prominent and nearby IM term of interest. This is the lower 5th odd order IM frequency component, conventionally expressed as $(3f_1-2f_2)$ with $m=3$ and $n=2$, giving the order $m+n=3+2=5$th. Here again the upper main tone locates itself in the upper sideband and the lower main tone in the lower sideband. To secure a constant frequency location for the 5th IM component, the ratio between the sweep width excursions become related in a two lower to three higher ratio, rather than the one to two ratio for the prior 3rd IM term. Again the range of audio sweep frequencies can be selected; the given example being for the specific case wherein the 5th IM term location is to be maintained within the flat bandpass region of the (lower) sideband channel at the designated position where $f_{IM3}$ occurred. In most applications, the measured response for the within band case would be substantially indicative of the transmission system's characteristic. Hence, in accordance with the prior given description for the derivation of the 3rd term, the 5th is readily established to be at the same relative frequency location thus allowing the output indicating analysis section to remain unchanged. Hence as far as the sensitivity, frequency response and bandwidth setting are of concern, the comparative measurement of the 3rd and 5th term are directly related for the output indication.

The following describes the nature of the test input signals for Mode 2:

$$\Delta F_i = (f_1 + f_2) \mp \Delta f_{d1}, \quad f_{mi} = f_c + \frac{f_2 f_1}{2} \mp \frac{5}{4} \Delta f_{d1}$$

| Input Signal | $f$ start | $f$ center | $f$ finish | $\Delta f_d$ | S.W. |
|---|---|---|---|---|---|
| (1) $f_1$ | 760 | 530 | 300 | $\pm f_{d230}$ | 460 |
| (2) $f_2$ | 310 | 655 | 1000 | $\mp 345$ | 690 | where $f_{IM5}$ lower $= 3f_1 + 2f_2 = 2900$ c.p.s. which is the same as for $f_{IM3}$ earlier. In intermodulation, odd order terms exist, and at times to the 7th, 9th etc. Practice has shown that in the narrow bandwidth and quasilinear (3rd or 5th degree curvatures) characteristics of ISB–SSB Systems only the 3rd and 5th are of substantial importance and when these conform to specified minimum limits, the higher terms are insignificant in amount.

It now becomes evident that the sweeping audio frequencies can be made to assume a triangular frequency variation with time with the modulating voltage waveform being a triangular generated voltage. With this manner of operation, it is readily possible to track and plot the 3rd IM term on one excursion across the 5″ CRT screen of the analyzer and, rather than flyback quickly and repeat the plot, on the equal rate return of the horizontal beam deflection, the 5th IM term can be tracked and plotted. This allows for the dual presentation of the two IM terms of importance on the same CRT display since the persistence characteristic of the P7 screen phosphorous coating is sufficient to maintain the pattern traced out by the 3rd term portion of the cycle.

The common synchronizing voltage of this type arrangement becomes the triangular sweep generation of which numerous methods of such generation are known. It is necessary to establish and maintain the sequence of sweep frequency deviations as given in calculations of this specification.

Also using this novel approach in the development of the sweep-audio frequencies, it can be seen that the frequency addition serves for the generation of sweep signal during 3rd IM tracking and also delivers signals required for 5th IM term operation. It is clear that a synchronized pulse output from a sweep voltage generator may be derived at the termination of a linear sawtooth waveform; and during the flyback time, actuate a switching signal alternator. This alternator operation may control the on-off position of a relay, wherein the ganged switching shown in the diagram is replaced by relay contact positions. Hence in this manner, one scan gives 3rd IM measurement and the succeeding scan cycle gives 5th IM measurement, both appearing on the screen at the same time due to CRT screen persistence. The mode of operation is more advantageous than tri-angular wave sweep wherein a less complex audio sweep generation is required.

It is now evident that a ISB–SSB Systems Test Set can be evolved with a sequence of programming established to effectively secure, in a graphical recording manner, the evaluation of ISB–SSB transmitters by relatively unskilled personnel on a production test basis if so desired.

It is now evident that the "sidebanding and heterodyne inversion" principle eliminates any subsequent discrepancy in this originated distortion measuring technique due to harmonics of the input signal $f_1$. In normal usage for common IM test, it can be seen that $(2f_1 - f_2)$ and $(f_3 - f_2)$ are equal when $f_3 = 2f_1$ or second harmonic. Stated verbally, the 3rd odd order term and the 2nd order difference frequency between a 2nd harmonic of tone and the other tone coincide.

However, by sidebanding and inversion, then for $f_1$ and 2nd harmonic $2f_1$, when combined about $f_{co}$ with USB signal $f_2$ gives components at: $(f_{co} - f_1)$; $(f_{co} - 2f_1)$ and $(f_{co} + f_2)$ then $(2f_{1a} - f_{2a}) = f_{IM3a}$; while $$(f_{co} - 2f_1) - (f_{co} + f2) = -2f_1 - f_2 = -(2f_1 + f_2)$$

or give audio value of $f_{IM3}$ relative which is suppressed from development within the narrow bandwidth of IF–RF common channels. Hence, at the translated RF regions, no difficulty is experienced due to differences (even) terms other than the existence of the 2nd harmonic as an RF signal of the combined wave. In this respect, it is required to avoid development of this harmonic tone term at or near the predetermined frequency location of the $f_{IM3}$ term within the LSB channel. The highest value 2nd harmonic term is at $f_{2nd}$ high $= 2xf_{1s}$ or the harmonic of the audio frequency at the start of the sweep excursion of $f_1$. Thus, at $f_{1s} = 1300$ c.p.s., $2xf_{1s} = 2600$ c.p.s. whereby $f_{IM3} - f_{1S} = 2900 - 2600 = 300$ c.p.s. or by absolute values $(f_{co} - 2900) - (f_{co} - 2600) = 97.1$ kc. $-97.4$ kc. $= [-300$ c.p.s.].

Accordingly, this frequency separation is for design purposes chosen as the minimum resolution setting of the analysis section of the test set to avoid interception of such a term should it develop, this being the worst case. Likewise, a corresponding difficulty due to possible harmonics is avoided at the lower or termination of the sweep cycle. Wherein $f_{1F} = 300$ c.p.s., 2nd $f_{1F} = 600$ c.p.s. then 2 (2nd $f_{1F}$) $+ f_{2F} = 2(600) + 2300 = 3500$ c.p.s. Thus, $f_{1M2ndf1F} - f_{1Mtf1F} = 3500 - 2900 = 600$ c.p.s.

Relatively high scanning velocities are allowable through this unique technique and the cathode beam trace remains continuously visual. The envelope delay of the ISB–SSB channel transmission system under test, particularly those of the crystal sideband filters limits the maximum changing rate. The buildup time of the resolving filter of narrow bandpass which lies in the signal processing path before it is detected also is a factor in determining the setting of the most rapid sweep rate. However, with the location of the swept frequency energy having started sufficiently away from the constant frequency location of the predetermined 2900 c.p.s. relative value of the IM term being monitored, no swept energy is injected in time coincidence with the resolving IF$_2$ bandwidth and ringing distortion is avoided.

To secure vertical scale calibration, only one static pair of tones is applied. The sweep voltage generation is disengaged (at 0 volt) and the two sweeping audio signals ($f_1$ and $f_2$) are then generating singular frequencies of $f_{1cF}$ and $f_{2cF}$ respectively (as in example 800 c.p.s. and 1300 c.p.s.). As this setting represents a static 2 tone test, both tones must be set to the 0 db calibration line of the screen and so adjusted to be equal by their output amplifiers or through the linear combining network adjustment.

It is here evident that this narrow band highly selective output analyzer must have a minimum residual intermodulation self distortion itself that is much below the expected distortion level to be measured of the transmissions output. A linear dynamic range for the measuring of 60 db or greater is possible.

It can now be seen that the uniqueness of this distortion tracking technique has its principle primarily based on the properties of additive side-banding and frequency inversion, and further takes novel advantage of the well-known operations as commonly supplied with most ISB-SSB transmission systems to originally produce this newly derived manner of IM distortion test of the IF-RF common stages of the transmitter.

While this unique presentation has been primarily concerned with the nominal total ISB-SSB common channel bandwith of 6K c.p.s. (with or without the presence of carrier frequency notch filtering), it is applicable to other narrow bandwiths with suitable modifications of the parameters as derived from the theory of operations herein disclosed and formulated.

Coupled with the introduction of this basic technique is the subsequent achievement of properly securing the ISB-SSB transmission channel evaluation of IM term distortion amplitude versus frequency of within band excursion for a wide dynamic (amplitude ratio) range in the most rapid and repeatable manner in accordance with this uniquely conceived test method and accompanying apparatus.

The block diagram of FIG. 1 illustrates the use of the dual swept audio frequency signal to obtain the plotting of the constant main intermodulation term response characteristic in the high frequency of an ISB-SSB transmission system via the highly selective reception, detection and plotting of this RF frequency component. In this "ISB distortion test set," wherein FIGS. 2, 3, and 4 are the practical example in one form, it is to be understood and maintained that the systematic arrangement of the combination of these designated circuit blocks in the manner shown, and the pattern of performance resulting from this method of system operation, as described herein is likewise applicable to test and evaluation of multichannel transmission systems, as for example four channel. It must be pointed out that the block diagrams and circuits arrangement illustrated show only the stage elements that are necessary to explain the operation of this invention of "ISB IM distortion test set" and that the practical instrument would contain many more conventionally known features, depending upon its specific design and application.

While the preferred embodiments of this invention as illustrated by the associated drawings and set forth in the specifications by way of example has been explained, it is clear that further modifications will become apparent to others skilled in the art. It is thereby not to have this invention limited by the particular arrangements shown and described. It is therefore desired that such variations occurring be considered as falling within the true spirit and scope of this invention as defined in the appended claims.

I claim:

1. A circuit arrangement for the generation of two separate sweep tones of equal amplitude which comprises:
    a variable sweep frequency audio frequency generator having a sawtooth sweep voltage generator and a voltage controlled audio oscillator
    a source of stable reference frequency higher than the frequency of said audio generator
    a first balanced modulator having connected to its inputs the outputs of said audio generator and said stable source
    a first upper sideband filter connected to receive the output of said first modulator for passing only the upper sideband frequencies thereof,
    frequency means for providing a signal at a frequency within the sweep range of said audio generator,
    a double balanced modulator having connected to one of its inputs the output of said audio generator
    connecting means for momentarily connecting the output of said frequency means to another input of said double balanced modulator
    a bandpass filter connected to the output of said double balanced modulator for passing only the static sum frequencies at the output thereof,
    a second balanced modulator having connected to its inputs the output of said bandpass filter and said source of reference frequency,
    a second upper sideband filter connected to pass therethrough only the sum frequency output of said second balanced modulator,
    a third balanced modulator having connected to its inputs the outputs of said first and second upper sideband filters,
    a first low pass filter connected to receive the output of said third balanced modulator and passing only the difference frequencies and having its output connected to said another input of said double balanced modulator, said filter output also providing one of said separate sweep tones,
    a second low-pass filter connected to receive the output of said double balanced modulator, passing only the difference whereby the output thereof is the other of said separate sweep tones which sweeps in a direction opposite to and at twice the sweep width of said one of said separate tones.

2. The circuit arrangement according to claim 1, wherein said frequency means is
    a frequency divider means having its input connected to said source of reference frequency.

3. Circuit apparatus to check the distortion introduced by the common stages of an Independent Side Band (ISB) transmitter also having a Lower Side Band (LSB) and an Upper Side Band (USB) channel each being capable of handling separate, different intelligence, and separate inputs to each of said channels comprising:
    a source of two separate sweep tones of equal amplitude, sweeping in opposite directions with one sweeping twice the sweep width of the other, and having an output terminal for each of said tones,
    electrical means connecting one of said output terminals to one of said channels and the other of said terminals to the other of said channels,
    selectable, variable translation converter means for translating down in frequency the output of said transmitter common stages including the third order intermodulation term ($F_{IM_3}$) thereof, about some intermediate frequency having connected thereto said output of said transmitter,
    resolving frequency converter means for further converting down in frequency the output of said translation means about some reference audio frequency and connected to the output of said translation means.
    detector and amplification means for detecting the output of said resolving means,
    a sweep sawtooth voltage source of a sweep rate equal to the rate of said separate tones,
    indicator means for coordinately and continuously plotting the relationship of two input signal levels,
    connecting means applying to one input of said indicator means the output of said detector means and to the other input said sawtooth source,
    whereby said indicator will display the distortion amplitude introduced by said common stages as a function of frequency.

4. The circuit apparatus according to claim 3, wherein said translation converter means comprises:
    a variable frequency synthesizer having a reference frequency input,
    a source of stable reference frequency connected to said reference frequency input whereby said synthesizer will generate a single frequency equal to $F_{IM_3}$ plus a multiple (N) of said reference frequency,
    a frequency converter having a mixer and amplifier and having connected to one of its inputs the output of said synthesizer.

5. The circuit apparatus according to claim 4, wherein said resolving means comprises:
a second frequency converter
a frequency multiplier of factor (N+1) and having connected to its input said source of stable frequency and output connected to one input of said second converter.

6. The circuit apparatus according to claim 5, wherein said indicator means is a cathode ray oscilloscope and said one input thereto are the vertical deflecting plates and the said other input is the horizontal deflection.

7. Circuit apparatus to check the distortion introduced by the common stages of an Independent Side Band (ISB) transmitter also having a Lower Side Band (LSB) and an Upper Side Band (USB) channel each being capable of handling separate, different intelligence, and separate inputs to each of said channels comprising:
a source of two separate sweeptones of equal amplitude, sweeping in opposite directions with one sweeping twice the sweep width of the other, and having an output terminal for each of said tones,
electrical means connecting one of said output terminals to one of said channels and the other of said terminals to the other of said channels,
a variable sweep frequency audio frequency generator having a sawtooth sweep voltage generator and a voltage controlled audio oscillator,
a source of stable reference frequency higher than the frequency of said audio generator
a first balanced modulator having connected to its inputs the outputs of said audio generator and said stable source,
a first upper sideband filter connected to receive the output of said first modulator for passing only the upper sideband frequencies thereof,
frequency means for providing a signal at a frequency within the sweep range of said audio generator,
a double balanced modulator having connected to one of its inputs the output of said audio generator,
connecting means for momentarily connecting the output of said frequency means to another input of said double balanced modulator,
a bandpass filter connected to the output of said double balanced modulator for passing only the static sum frequencies at the output thereof,
a second balanced modulator having connected to its inputs the output of said bandpass filter and said source of reference frequency,
a second upper sideband filter connected to pass therethrough only the sum frequency output of said second balanced modulator,
a third balanced modulator having connected to its inputs the outputs of said first and second upper sideband filters,
a first low pass filter connected to receive the output of said third balanced modulator and passing only the difference frequencies and having its output connected to said another input of said double balanced modulator, said filter output also providing one of said separate sweep tones,
a second low-pass filter connected to receive the output of said double balanced modulator, passing only the difference whereby the output thereof is the other of said separate sweep tones which sweeps in a direction opposite to and at twice the sweep width of said one of said separate tones,
electrical means connecting one of said tone outputs to one of said channels and the other of said tone outputs to the other of said channels,
selectable, variable translation converter means for translating down in frequency the output of said transmitter common stages including the third order intermodulation term ($F_{IM_3}$) thereof, about some intermediate frequency having connected thereto said output of said transmitter,
resolving frequency converter means for further converting down in frequency the output of said translation means about some reference audio frequency and connected to the output of said translation means,
detector and amplification means for detecting the output of said resolving means,
indicator means for cordinately and continuously plotting the relationship of two input signal levels
connecting means applying to one input of said indicator means the output of said detector means and to the output of said sawtooth generator,
whereby said indicator will display the distortion amplitude introduced by said common stages as a function of frequency.

8. The circuit apparatus according to claim 7, wherein said translation converter means comprises:
a variable frequency synthesizer having a reference frequency input,
an electrical connection between said reference input and the output of said source of stable reference frequency,
whereby said synthesizer can generate a single frequency equal to $F_{IM_3}$ plus a multiple (N) of said reference frequency,
a frequency converter having a mixer and amplifier and having connected to one of its inputs the single frequency output of said synthesizer.

9. The circuit apparatus according to claim 8, wherein said resolving means comprises:
a second frequency converter
a frequency multiplier of factor (N+1) and having connected to its input said source of stable frequency and output connected to one input of said second converter.

10. The circuit apparatus according to claim 9, wherein said indicator means is a cathode ray oscilloscope and said one input thereto are the vertical deflecting plates and the said other input is the horizontal deflection.

11. An AFC and frequency stabilized frequency translation closed loop circuit for translating a pair of equal amplitude, sweeping tone signals $f_1$ and $f_2$ of like scan direction and the audio difference frequency between said pair of tones is being linearly varied such that one odd order difference frequency modulation component term is of constant frequency location of $f_{IM_k}$, is positioned at a pre-determined first intermediate frequency value of $f_{IF_1}$ comprising:
a first frequency converter receiving said pair of sweeping tone signals of $f_1$ and $f_2$ as signal input,
a voltage controlled local oscillator generating a first local oscillation signal at a frequency of $(f_{IM_k}+f_{IF_1})$, where $f_{IF_1}$ is said first intermediate frequency value, having its output connected to the other input of said first frequency converter,
said first frequency converter translated output being the difference frequency products between said inputs,
a second frequency converter receiving said translated output of said first converter as its signal input,
a source of single crystal controlled reference signal of frequency value $f_{IF_2}$, where $f_{IF_2}$ is a second intermediate frequency value,
a frequency multiplier of factor "$n$" having said single reference frequency $f_{IF_2}$ as its input,
said frequency multiplier output of $(nf_{IF_2})$ being of frequency value equal to the sum of said first intermediate frequency and said second intermediate frequency and being applied as second local oscillator input to said second frequency converter,
said second frequency converter translated output being the difference frequency product between said inputs,
a non-linear device connected to receive said translated output of said second frequency converter as its input, said non-linear device producing odd order distortion output of said input signal insuring development of constant frequency odd order difference frequency intermodulation component at frequency value of $(f_{1F_2}(\pm)\Delta\epsilon)$, where $\Delta\epsilon$ solely represents frequency translation error of first frequency conversion operation, a narrow bandwidth band pass filter of center frequency value $f_{CF}=f_{1F_2}$ receiving said odd order distortion output of said non-linear device, said band-pass filter passing only said constant frequency intermodulation component term of $$(f_{1F_2}(\pm)\Delta\epsilon)$$

a frequency discriminator and a phase comparator combination, wherein the center frequency reference of said frequency discriminator stage is $f_{CF}=f_{1F_2}$ and said phase comparator stage receiving said single crystal controlled reference frequency $f_{1F_2}$ as its reference input, said frequency discriminator and phase comparator combination receiving its error signal input of $$[f_{1F_2}(\pm)\Delta\epsilon]$$

from output of said band pass filter, said frequency discriminator-phase comparator combination responding to said error signal input closing the automatic frequency control loop by applying the correction voltage output to control said voltage controlled local oscillator frequency output, whereby the constant frequency term of $f_{IM_k}$ of said input signal to said first converter is exactly frequency translated to be positioned at frequency value of $f_{IF_1}$, and thereafter stabilized thereat in an automatic control manner.

References Cited
UNITED STATES PATENTS

| | | |
|---|---|---|
| 2,381,940 | 8/1945 | Wallace. |
| 2,570,305 | 10/1951 | Barney _____ 325—67 |
| 2,705,742 | 3/1955 | Miller. |
| 2,738,417 | 3/1956 | Hunt et al. _____ 325—65 |
| 2,741,740 | 4/1956 | Beck _____ 324—58 |
| 2,952,770 | 9/1960 | Downie _____ 325—133 |
| 2,954,465 | 9/1960 | White. |
| 2,958,729 | 11/1960 | Licklider. |
| 3,119,062 | 1/1964 | Codd. |
| 3,171,897 | 3/1967 | Wlasuk _____ 325—363 X |

ROBERT L. GRIFFIN, *Acting Primary Examiner.*
JOHN W. CALDWELL, *Examiner.*
B. V. SAFOUREK, *Assistant Examiner.*